(12) United States Patent
Beshai

(10) Patent No.: US 8,428,071 B2
(45) Date of Patent: Apr. 23, 2013

(54) SCALABLE OPTICAL-CORE NETWORK

(75) Inventor: Maged E. Beshai, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 517 days.

(21) Appl. No.: 11/526,548

(22) Filed: Sep. 25, 2006

(65) Prior Publication Data

US 2008/0075071 A1   Mar. 27, 2008

(51) Int. Cl.
*H04L 12/56* (2006.01)
(52) U.S. Cl.
USPC ........................................................ 370/400
(58) Field of Classification Search .......... 370/386–388, 370/360, 376, 400; 398/45
See application file for complete search history.

(56) References Cited

U.S. PATENT DOCUMENTS

| | | | |
|---|---|---|---|
| 6,065,063 A * | 5/2000 | Abali ............................ | 709/242 |
| 6,356,546 B1 | 3/2002 | Beshai | |
| 6,570,872 B1 | 5/2003 | Beshai et al. | |
| 6,876,649 B1 | 4/2005 | Beshai | |
| 6,882,799 B1 | 4/2005 | Beshai et al. | |
| 6,920,131 B2 | 7/2005 | Beshai | |
| 7,102,999 B1 * | 9/2006 | Sindhu et al. .................. | 370/235 |
| 2001/0006522 A1 * | 7/2001 | Beshai ........................... | 370/380 |
| 2004/0037558 A1 * | 2/2004 | Beshai ............................ | 398/57 |
| 2004/0091264 A1 | 5/2004 | Beshai | |
| 2004/0165887 A1 | 8/2004 | Beshai | |
| 2005/0078666 A1 * | 4/2005 | Beshai ........................... | 370/380 |
| 2005/0271046 A1 * | 12/2005 | Bianco et al. .................. | 370/386 |
| 2006/0013144 A1 * | 1/2006 | Rodrigo ......................... | 370/249 |
| 2006/0120379 A1 | 6/2006 | Beshai | |
| 2006/0221948 A1 * | 10/2006 | Benner et al. .................. | 370/389 |
| 2006/0245356 A1 * | 11/2006 | Porat et al. ..................... | 370/232 |
| 2007/0280261 A1 * | 12/2007 | Szymanski ................. | 370/395.4 |
| 2008/0075460 A1 * | 3/2008 | Islam .............................. | 398/45 |

FOREIGN PATENT DOCUMENTS

| | | |
|---|---|---|
| JP | 8-319379 | 12/1996 |
| JP | 10-252762 | 9/1998 |
| JP | 2001-221243 | 8/2001 |
| JP | 2001-241450 | 9/2001 |
| JP | 2002-227858 | 8/2002 |
| JP | 2002-323056 | 11/2002 |
| JP | 2003-148626 | 5/2003 |
| JP | 2003-269617 | 9/2003 |

* cited by examiner

*Primary Examiner* — Dang Ton
*Assistant Examiner* — Kevin Lee
(74) *Attorney, Agent, or Firm* — Guerin & Rodriguez, LLP

(57) ABSTRACT

A network comprising a large number of electronic edge nodes interconnected through bufferless optical switch planes so that a signal from any edge node to any other edge node traverses only one switch plane scales to a capacity of hundreds of petabits per second while providing global geographic coverage. Each edge node is time-locked to each optical switch plane to which it connects to enable loss-free time-sharing of the network core despite the absence of buffers in the core. In an alternate implementation, a relatively small number of electronic switch units may be employed in a predominantly-optical core. In addition to scalability and high performance, the simple structure of the network significantly simplifies addressing and routing.

14 Claims, 22 Drawing Sheets

SCALABLE OPTICAL-CORE NETWORK

FIELD OF THE INVENTION

The present invention relates to telecommunications networks and, more particularly, to scalable telecommunications networks that employ optical switches.

BACKGROUND OF THE INVENTION

The Internet is a global data network that has indeed revolutionized telecommunications. The Internet, however, was not designed for growth, or for providing advanced services requiring global end-to-end broadband connections. The Internet, in its present form, is basically a complex interconnection of primitive nodes called "routers." The network's structural complexity led to complex routing systems which, in turn, limit the network's capabilities. The global access capacity of the Internet is still in the order of a few terabits per second.

The limitations of the Internet are widely recognized and the network-research community is looking for simple alternatives. The simplification of network structures and network protocols can enable the introduction of advanced services with high performance at low cost. Steps toward providing a simplified network structure are described in the following:

U.S. Pat. No. 6,356,546: "Universal transfer method and network with distributed switch";
U.S. Pat. No. 6,570,872: "Self-configuring distributed switch";
U.S. Pat. No. 6,876,649: "High-capacity WDM-TDM packet switch";
U.S. Pat. No. 6,882,799: "Multi-grained network";
U.S. Pat. No. 6,920,131: "Global distributed switch"; and
United States Patent Publication No. 20040091264: "Hybrid fine-coarse carrier switching".

A wholesale change of the Internet structure to overcome the shortcomings of the present structure is overdue and its realization is facilitated by advances in electronic and optical devices that enable constructing powerful—yet simple—switching/routing nodes of high capacity, spectral multiplexers and demultiplexers, and efficient fiber-optic links for interconnecting such nodes. Advances in fast optical switches enable deployment of optical core nodes of fine granularity thus eliminating the need for optical-to-electronic and electronic-to-optical conversions which are used today in electronic core nodes. There are, however, challenges in optical-core deployment, mainly due to the absence of photonic buffers, at least with the present state of the art. These challenges include timing difficulty, scheduling difficulty, and scalability of fast switching nodes.

SUMMARY OF THE INVENTION

The present invention addresses the issues discussed above by providing novel switch planes that comprise both large-dimension optical switch units and fast optical switch units. Each large-dimension optical switch unit may have a large number of input and output ports; of the order of 1000 for example. The large-dimension optical switch units may be slow switches, with switching latency of the order of 10 milliseconds, while the fast optical switch units have a small switching latency; of the order of 10 nanoseconds for example. Switch planes each having a capacity of the order of one petabit per second can be produced in accordance with the present invention.

A switch plane, according to the present invention, comprises a first plurality of fast optical switch units, a second plurality of large-dimension optical switch units, and a third plurality of fast optical switch units. The first plurality of fast optical switch units each has a plurality of inlet ports adapted to receive traffic from edge nodes and a plurality of outward ports connected to input ports of the large-dimension optical switch units. The third plurality of fast switch units each has a plurality of inward ports connected to output ports of the large-dimension optical switch units and a plurality of outlet ports adapted to send traffic to edge nodes.

The first plurality of fast optical switch units and the third plurality of fast optical switch units are preferably replaced by a plurality of integrated fast optical switch units each having a plurality of inward ports connected to output ports of the large-dimension switch units, a plurality of outward ports connected to input ports of the large-dimension switch units, a plurality of inlet ports adapted to receive traffic from edge nodes, and a plurality of outlet ports adapted to send traffic to edge nodes.

Switch planes of the present invention can be incorporated into optical-core networks of fine granularity that are scalable to global coverage and a capacity of the order of hundreds of petabits per second (petabit: $10^{15}$ bits per second). The capacity of optical-core networks of the present invention scales to more than ten-thousand times the access capacity of the current Internet. Due to its structural simplicity, networks of the present invention can employ simplified and robust routing schemes.

In accordance with an embodiment, the present invention provides a network comprising a plurality of switch planes each switch plane having a plurality of first switch units interconnected through a plurality of second switch units. Each of the first switch units has a switching latency substantially less than a switching latency of each of the second switch units and a dimension substantially less than a dimension of each of the second switch units. At least one of the first switch units is a fast optical switch unit and at least one of the second switch units is a slow optical switch unit. The plurality of switch planes interconnects a plurality of edge nodes. Each edge node has at least one upstream channel to at least one of the first switch units and at least one downstream channel from at least one of the first switch units. Each edge node is time locked to each first switch unit to which the edge node connects.

In accordance with another embodiment, the present invention provides a network comprising a plurality of switch planes, each switch plane having a plurality of first switch units interconnected through a switch-plane core. The switch-plane core comprises a plurality of second switch units, at least one electronic switch unit, and a switch-plane controller in communication with a selected one of the at least one electronic switch units. Each of the first switch units has a switching latency substantially less than a switching latency of each of the second switch units and a dimension substantially less than a dimension of each of the second switch units. Each of the at least one electronic switch unit has a dimension exceeding the dimension of each of the second switch units. The switch planes interconnect a plurality of edge nodes, each having at least one upstream channel to at least one of the first switch units and at least one downstream channel from at least one of the first switch units.

In accordance with another embodiment, the present invention provides a method of switching through a switch plane in a network. The method comprises: switching signals through a plurality of first switch units; switching the signals through a plurality of second switch units, where each of the first switch units is adapted for reconfiguration at a reconfiguration rate greater than a reconfiguration rate of each of the second switch units; and switching the signals through a plurality of third switch units, where each of the third switch units has a reconfiguration rate greater than the reconfiguration rate of each of the second switch units. The reconfiguration rate of each switch unit from among the first switch units and the third switch units is at least an order of magnitude greater than the reconfiguration rate of each of the second switch units. The method comprises performing second-order time-slot matching processes to schedule connections for the signals through the first switch units and the third switch units. The method further comprises a process of periodic reconfiguration of at least one of the second switch units based on configuration-change instructions received from a global reconfiguration server.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

An envisaged new network structure, according to the present invention, employs an optical core of fine granularity and aims at reducing the mean number of hops between sources and sinks, weighted by the flow rates of the network's traffic streams. This is because, as a general rule, routing complexity increases rapidly, and network efficiency decreases rapidly, as the number of hops from source to sink increases. Therefore, it is desirable to explore a network architecture that provides very high access capacity and very wide coverage (i.e., accommodating a very large number of edge nodes) while realizing the minimum number of hops provided in the intermediate-coverage networks of the prior art, such as the networks taught in U.S. Pat. Nos. 6,570,872 and 6,882,799.

The present invention addresses these and other issues by providing novel switch planes that comprise both large-dimension optical switch units and fast optical switch units. (A switch having P input ports and Q output ports is said to have a dimension of P×Q.) Each large-dimension optical switch unit may have a dimension of the order of 1000×1000. The fast optical switch units may have a latency of less than a microsecond. Switch planes each having a capacity of some 1.3 petabits per second can be produced in accordance with the present invention.

Figure 1:
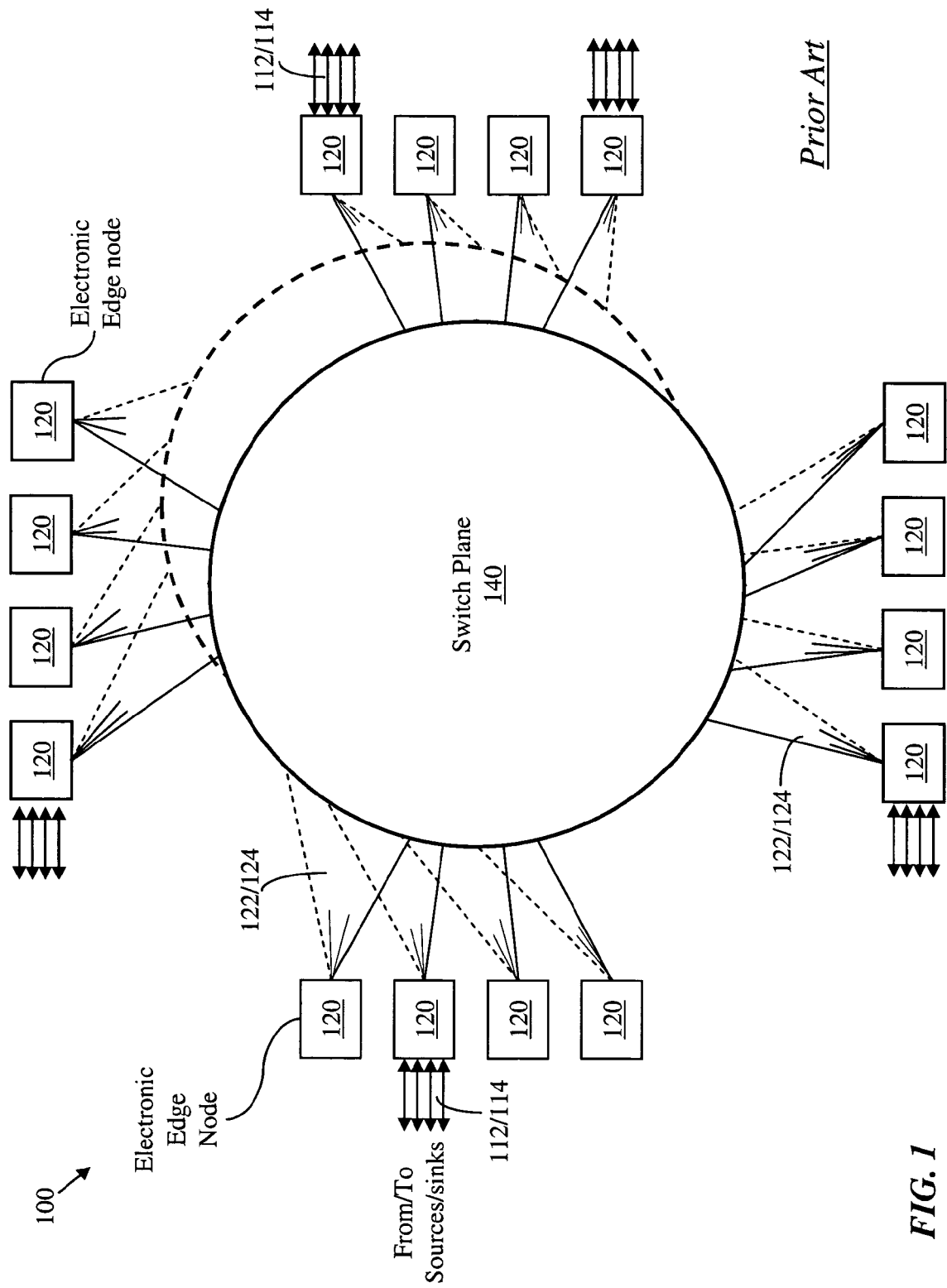
FIG. 1 illustrates a prior-art network comprising edge nodes interconnected through parallel switch planes.

FIG. 1 illustrates a prior-art network 100 comprising electronic edge nodes 120 interconnected through parallel switch planes 140. Each edge node 120 connects to at least one switch plane 140 through at least one dual channel 122/124. An edge node 120 may connect to a plurality of the switch planes 140. In fact, an edge node 120 may have a dual channel 122/124 to each of the switch planes 140. A dual channel 122/124 comprises an upstream channel 122 from an edge node 120 to a switch plane 140 and a downstream channel 124 from a switch plane 140 to the same edge node.

Each switch plane 140 has a plurality of inlet ports and a plurality of outlet ports. Each edge node 120 has a plurality of ingress ports capable of receiving traffic from traffic sources, a plurality of egress ports capable of transmitting traffic to data sinks, a plurality of inbound ports capable of receiving traffic from outlet ports of switch planes 140 through downstream channels 124, and a plurality of outbound ports capable of transmitting traffic to inlet ports of switch planes 140 through upstream channels 122.

To simplify traffic routing and realize high performance, a data unit transmitted from a first edge node 120 to a second edge node 120 preferably traverses only one switch plane 140. A connection from a first edge node 120 to a second edge node 120 may be effected through several parallel paths each traversing a single switch plane 140. Although a path from a first edge node 120 to a second edge node 120 may be completed through an intermediate edge node 120, the use of such a path is preferably entirely avoided. That is, a path through an intermediate edge node 120 is undesirable. Such a path traverses a first switch plane 140 to connect the first edge node to the intermediate edge node, and traverses either the same switch plane 140 or a second switch plane 140 to connect the intermediate edge node 120 to the second edge node 120.

The number of edge nodes 120 that can be accommodated in network 100, given the objective of using only one switch plane 140 to transfer a data unit from a first edge node 120 to a second edge node, is determined by the dimensions (the number of inlet and outlet ports) of the switch planes 140. With switch planes 140 of equal dimensions, M×M, i.e., each having M>1 inlet ports and M>1 outlet ports, the number of edge nodes 120 that can be accommodated in network 100 is M.

The capacity of network 100, defined as the lesser of the total capacity of the ingress ports of all edge nodes 120 or the total capacity of egress ports of all edge nodes 120, is determined by the dimensions (M×M) of each switch plane 140 and the number L of access dual links 112/114 of each of the edge nodes 120. Each edge node 120 is preferably non-blocking, or substantially non-blocking, and the total capacity of egress ports may equal the total capacity of ingress ports. A non-blocking edge node 120 provides an internal path from any free ingress port to any free outbound port and from any free inbound port to any free egress port.

High performance electronic edge nodes that scale to very high capacities are realizable with the present state of the art. U.S. patent application Ser. No. 10/780,557, Publication No. 2004/0165887, titled "Circulating Switch," discloses an electronic switch that may be used as an edge node 120 or a core node and which scales to a capacity exceeding 100 terabits per second. An edge node 120 constructed as a circulating switch may dedicate hundreds of outbound ports and inbound ports to connect to switch planes 140.

An edge node 120 in network 100 may have a large number of upstream channels 122 to switch planes 140 and a large number of downstream channels 124 from switch planes 140. If the switch planes 140 are collocated, then the channels 122 from an edge node 120 may be multiplexed on an upstream link, or multiple upstream links, and downstream channels 124 directed to a single edge node 120 may be multiplexed on a downstream link, or multiple downstream links. In a network 100 covering a wide geographic area, such as a continent or the entire Globe, the switch planes 140 are preferably distributed. Thus, the upstream channels 122 from an edge node 120 would be directed to, and the downstream channels 124 to the edge node would be received from, switch planes 140 of different geographic locations. To exploit wavelength division multiplexing ("WDM") economy, groups of edge nodes 120 may share wavelength routers, well known in the art, in both the upstream and downstream directions.

Figure 2:
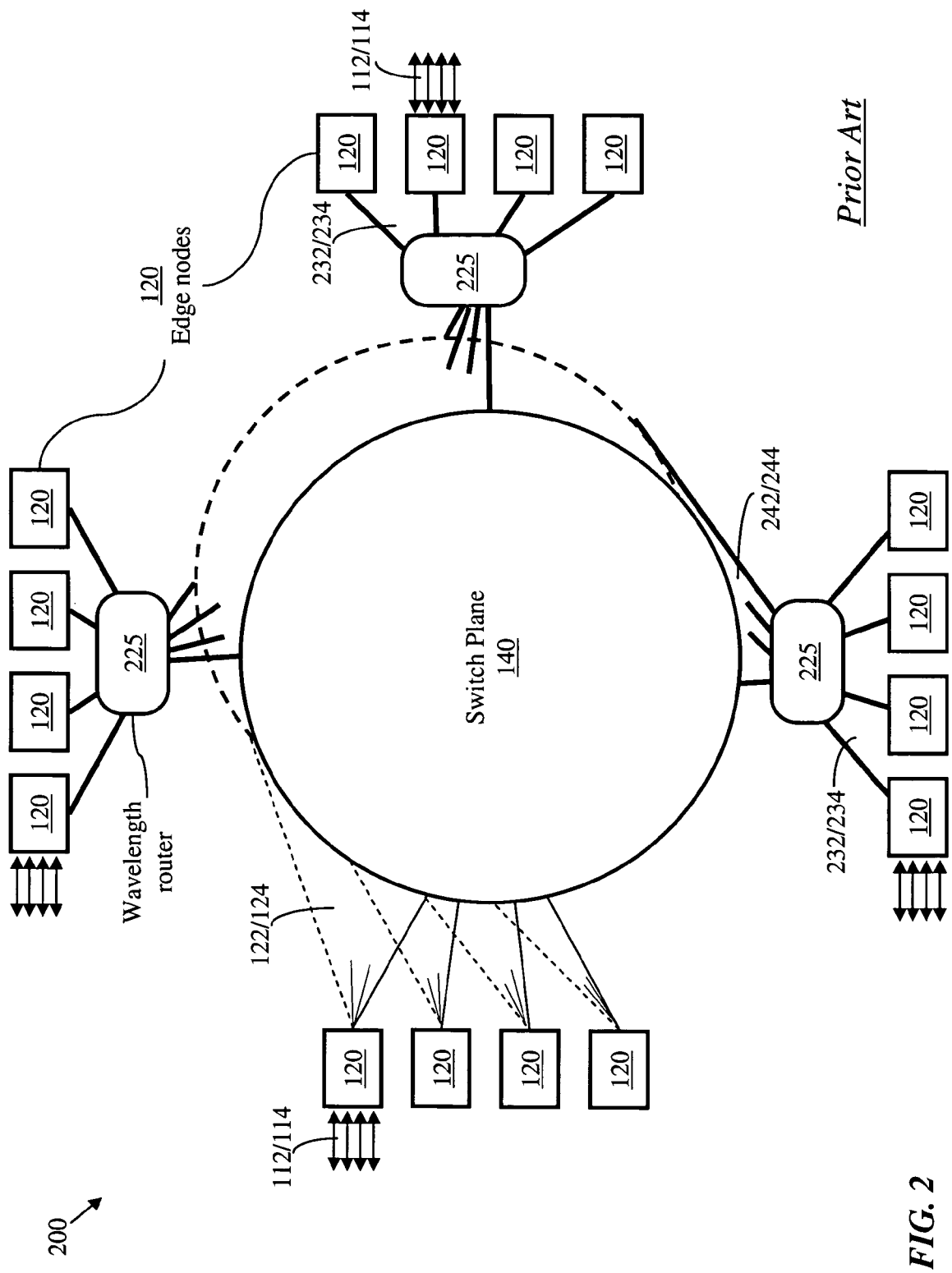
FIG. 2 illustrates a prior-art network comprising edge nodes interconnected through parallel switch planes with wavelength routers connecting some edge nodes to the parallel switch planes.

FIG. 2 illustrates a network 200, similar to network 100, which uses bidirectional wavelength routers 225 to connect edge nodes 120 to the distributed switch planes 140. A bidirectional wavelength router 225 includes an upstream unit and a downstream unit, which are not identified separately in FIG. 2. Each edge node 120 has an upstream WDM link 232 to one of the wavelength routers 225 and a downstream WDM link 234 from one of the wavelength routers 225. A wavelength router 225 receives upstream WDM links 232 from several edge nodes 120 and recombines constituent individual wavelength channels from different edge nodes 120 into inner WDM links 242, each WDM link 242 connecting to one of the switch planes 140. Thus, each edge node 120 can direct a wavelength channel to each switch plane 140. In the downstream direction, a wavelength router 225 receives several WDM links 244, each WDM link 244 from one of the switch planes 140, and recombines individual wavelength channels into WDM links 234, each WDM link 234 leading to a single edge node 120. An edge node 120 may be connected directly to the switch planes 140 using fiber links 122 each having only one wavelength channel from the edge node 120 to a switch plane 140 and fiber links 124 each having one wavelength channel from the switch plane 140 to the edge node 120 as indicated in FIG. 1 and FIG. 2. This would be justifiable, for example, in a network 100 or 200 of limited geographic coverage with relatively small distances between the edge nodes 120 and the switch planes 140.

As described above, a crucial design parameter is the dimension of a switch plane 140. The dimension of a switch plane 140 determines the number of edge nodes 120 that can be accommodated within the network 100 or 200. U.S. Pat. No. 6,486,983 ("Agile optical-core distributed packet switch") discloses a network similar to networks 100 or 200 with each switch plane 140 comprising a single-stage, non-blocking, optical switch fabric and is, therefore, suitable for a network of moderate coverage. U.S. Pat. No. 6,876,649 ("High-capacity WDM-TDM packet switch") discloses a network with each switch plane 140 comprising an electronic space switch implemented as a rotator-based space switch. A rotator-based space switch may scale to relatively high dimensions, for example 4096×4096, and—being electronic based—is fast switching, enabling the construction of an efficient network of fine granularity. Using edge nodes of a capacity of 10 terabits per second each, with half the capacity allocated to source and sink access and the other half allocated to connect to the switch planes, a network of a capacity exceeding 20,000 terabits per second can be constructed. It is noted, however, that despite this enormous capacity (as compared with the access capacity of the current Internet), the number of edge nodes is still limited to about 4,000, which may limit the network to continental coverage (covering North America, for example). It is also noted that an electronic switch plane requires optical-to-electrical ("O/E") conversion at each inlet port, and electrical-to-optical ("E/O") conversion at each outlet port.

In order to avoid O/E and E/O conversions, the switch planes 140 may employ fast optical switches. A single-stage, fast optical switch may be limited to a small dimension, 64×64 for example. It is known to arrange single-stage switch units in cascaded arrays to form multi-stage switches of higher capacities. However, scheduling connections in multi-stage bufferless switches requires complex processing. A three-stage switch based on bufferless switch units of dimension 64×64 each would have a dimension of 4096 and would require a complex time-slot-matching process to schedule connections.

Before describing the present invention, it is useful to clearly define some of the terms that are used in the specification.

In a switch plane comprising space-switch units, a connection traversing one switch unit and requesting a number S of time slots, where S>0, requires that the two corresponding ports be free (unassigned) during any S "matching" time slots in a predefined time frame and the process of allocating a matching time slot is called a first-order matching process. A connection traversing two switch units, without intermediate buffering, and requesting S>0 time slots requires that three corresponding ports be free during any S matching time slots in a predefined time frame and the process of allocating a matching time slot is called a second-order matching process. In general, a connection traversing a number J of switch units where J>0, without intermediate buffering, and requesting S>0 time slots requires that (J+1) corresponding ports be free during any S matching time slots in a predefined time frame and the process of allocating a matching time slot is called a $J^{th}$-order matching process. To facilitate a $J^{th}$-order matching process in a switch plane, an occupancy-state array is associated with each input port of each switch unit in the switch plane and with each output port of each destination switch unit in the switch plane. As used herein, a destination switch unit is a switch unit that connects to destination edge nodes. The number of occupancy-state arrays to be examined for a $J^{th}$-order connection is (J+1). It is noted that the processing effort increases rapidly and non-linearly as the number J of traversed switch units increases.

A fully connected switch is defined herein as a switch, having a plurality of input ports and a plurality of output ports, which can provide an internal path from any input port to any output port. More specifically, a fully connected switch can allocate paths of a total capacity of C (bits per second) from any subset of input ports collectively having a capacity of C (bits per second) to any subset of output channels, collectively having a capacity that equals or exceeds C. For example, in a fully connected switch, an input port can transfer its entire received traffic to an output port of at least the same capacity of the input port. Therefore, any spatial variation of traffic loads can be accommodated.

The term "wavelength router" is used to refer to an optical device, well-known in the art, having input ports each connecting to a wavelength-division multiplexed (WDM) input link and output ports each connecting to a WDM output link. Wavelength channels received at a WDM input link are routed to corresponding WDM output links. The routing pattern is static; typically based on a spatial cyclic mapping of input wavelengths to output ports. Wavelength routers are not essential elements in the network of the present invention; however, their deployment is beneficial in a network where the edge nodes are distributed over a wide area.

The amount of time an optical switch takes to change input-output connectivity is referred to as the switching latency of the switch. Thus, a smaller switching latency means a faster switch. With current optical switching technology, the faster the switch the less scalable the switch. On the other hand, large switches (i.e., having large dimensions) tend to be relatively slow (i.e., have a large switching latency time). That is, faster switches tend to have smaller dimensions and slower switches may have higher dimensions.

Switch Plane

The present invention takes advantage of the speed of smaller optical switch units and the size of higher-dimensional switch units to provide for novel switch planes that can be used to produce optical-core networks of fine granularity that are scalable to global coverage and a capacity of the order of hundreds of petabits per second. A switch plane of the present invention includes a first plurality of fast optical switch units, a second plurality of inner large-dimension optical switch units, and a third plurality of fast optical switch units. For example, fast optical switch units of the present invention may have a switching latency of less than 1 microsecond and preferably less than 20 nanoseconds. Each large-dimension optical switch of the present invention, on the other hand, may have more than 1000 input ports and more than 1000 output ports.

Figure 3:
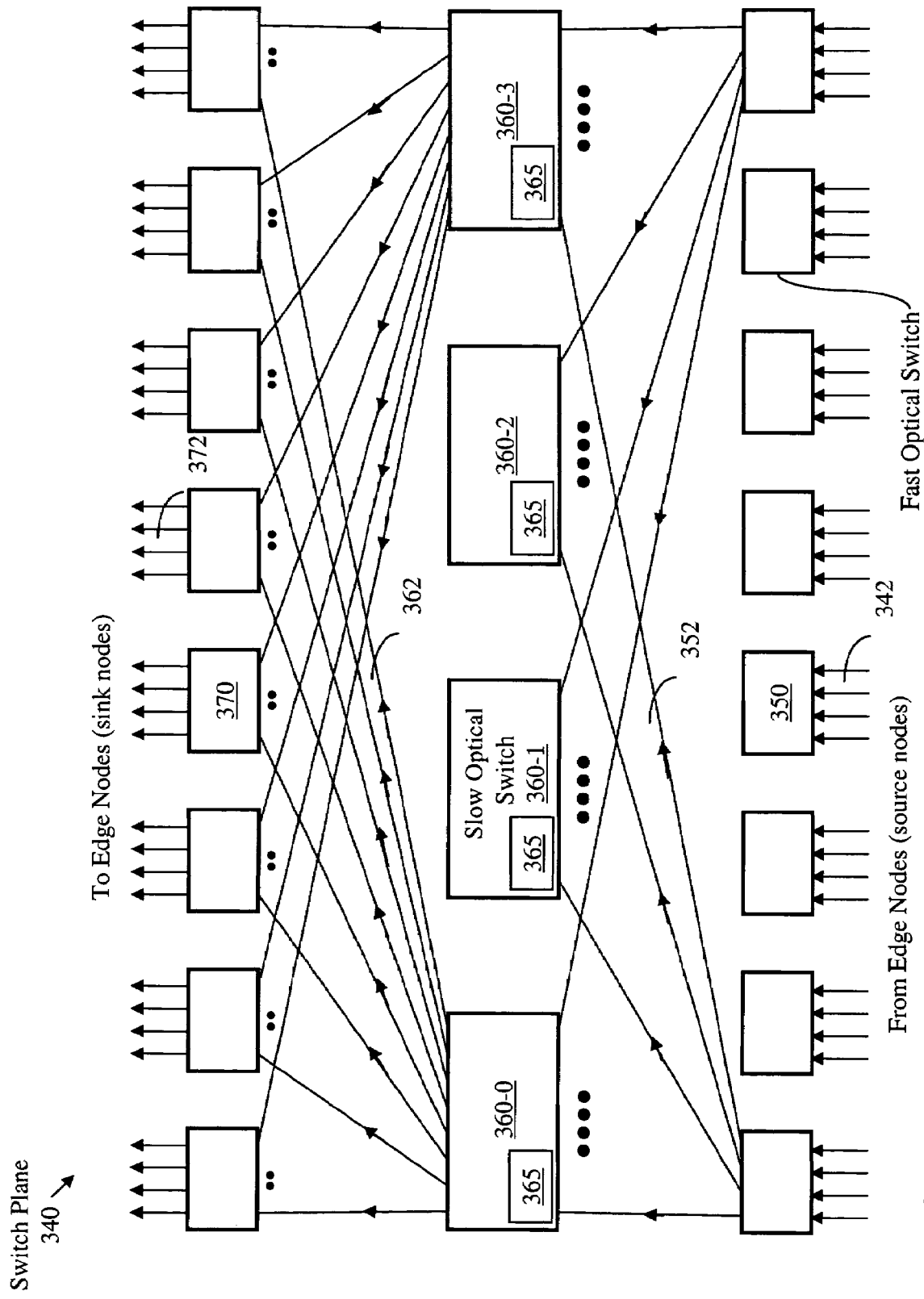
FIG. 3 illustrates a switch plane according to the present invention comprising a first plurality of fast optical switch units, a second plurality of inner large-dimension optical switch units, and a third plurality of fast optical switch units.

FIG. 3 illustrates a switch plane 340 according to the present invention comprising a first plurality of fast optical switch units 350, a second plurality of inner large-dimension slow optical switch units 360, and a third plurality of fast optical switch units 370. The first plurality of fast optical switch units 350 are interlaced with the large-dimension optical switch units 360, which are interlaced with the third plurality of fast optical switch units 370, thus forming a three-stage switch. Each large-dimension slow optical switch unit 360 has a configuration controller 365, which is a slave controller that receives instructions from a controller of switch plane 340 (not illustrated) to set internal paths through the switch unit 360. A fast optical switch 350 or 370 may have a relatively small dimension—64×64 for example. A large-dimension optical switch unit 360 may have a significantly larger dimension—2048×2048, for example. The dimension of switch plane 340 would then scale to 131,072×131,072.

The input ports of fast switch units 350 that receive traffic through channels 342 from edge nodes are referred to herein as inlet ports. The output ports of fast switch units 350 that send traffic through channels 352 to input ports of large-dimension switch units 360 are referred to as outward ports. The input ports of fast switch units 370 that receive traffic through channels 362 from output ports of large-dimension switch units 360 are referred to herein as inward ports. The output ports of fast switch units 370 that send traffic through channels 372 to edge nodes are referred to herein as outlet ports. With each input or output port of each switch unit 350, 360, or 370 having a capacity of 10 gigabits per second (Gb/s), the capacity of switch plane 340 would exceed 1.3 petabits per second.

A fast switch 350 or 370 may have a switching latency of the order of 20 nanoseconds, for example, while a large-dimension switch unit 360 may have a switching latency of several milliseconds, for example. In operation, the large-dimension switch units 360 may reconfigure (i.e., change their internal connectivity pattern) at a slow pace; every few seconds for example. Fast switch units 350 or 370, on the other hand, may reconfigure much more frequently. Thus, fast switch units 350 or 370 can be reconfigured many times for each reconfiguration of a large-dimension switch unit 360. During a configuration phase of the fast switch units 350 or 370, the internal connectivity of the large-dimension switch units 360 may remain unchanged and the switch units 360 may be treated as static connectors. The entire switch plane 340 would then be functionally reduced to a two-stage switch. It is well known, however, that such a two-stage switch is not a fully connected switch as defined above and may not accommodate traffic of arbitrary time-varying spatial distribution. However, this shortcoming is remedied by using a sufficient number of switch planes 340, with the connectivity of at least one of the large-dimension switch units 360 of each switch plane 340 slowly adjusted according to variations of the spatial traffic distribution.

Fine switching granularity may be implemented using a time-division-multiplexing ("TDM") scheme where a connection occupies a number of time slots in a slotted time frame. With the large-dimension optical switch units 360 of the three-stage switch plane 340 treated as a static connector, a connection from an inlet port of a fast switch 350 to an outlet port of a fast switch 370 requires a second-order time-slot matching process.

A fast switch unit 350 and a fast switch unit 370 may be integrated into a single switch fabric in order to enable direct switching of optical signals from inlet ports to outlet ports. In this manner, the time-slot-matching process is reduced from a second-order process to a first order process for some connections, thus reducing the amount of traffic traversing the large-dimension optical switch units 360. It is noted that while the large-dimension optical switch units 360 are practically static connectors, reducing their traffic implies reducing the occupancy of the outward ports of fast switch units 350 and inward ports of fast switch units 370, thus facilitating the allocation of free time slots for a connection that traverses a large-dimension switch unit 360 and needs a second-order time-slot matching process.

Figure 4:
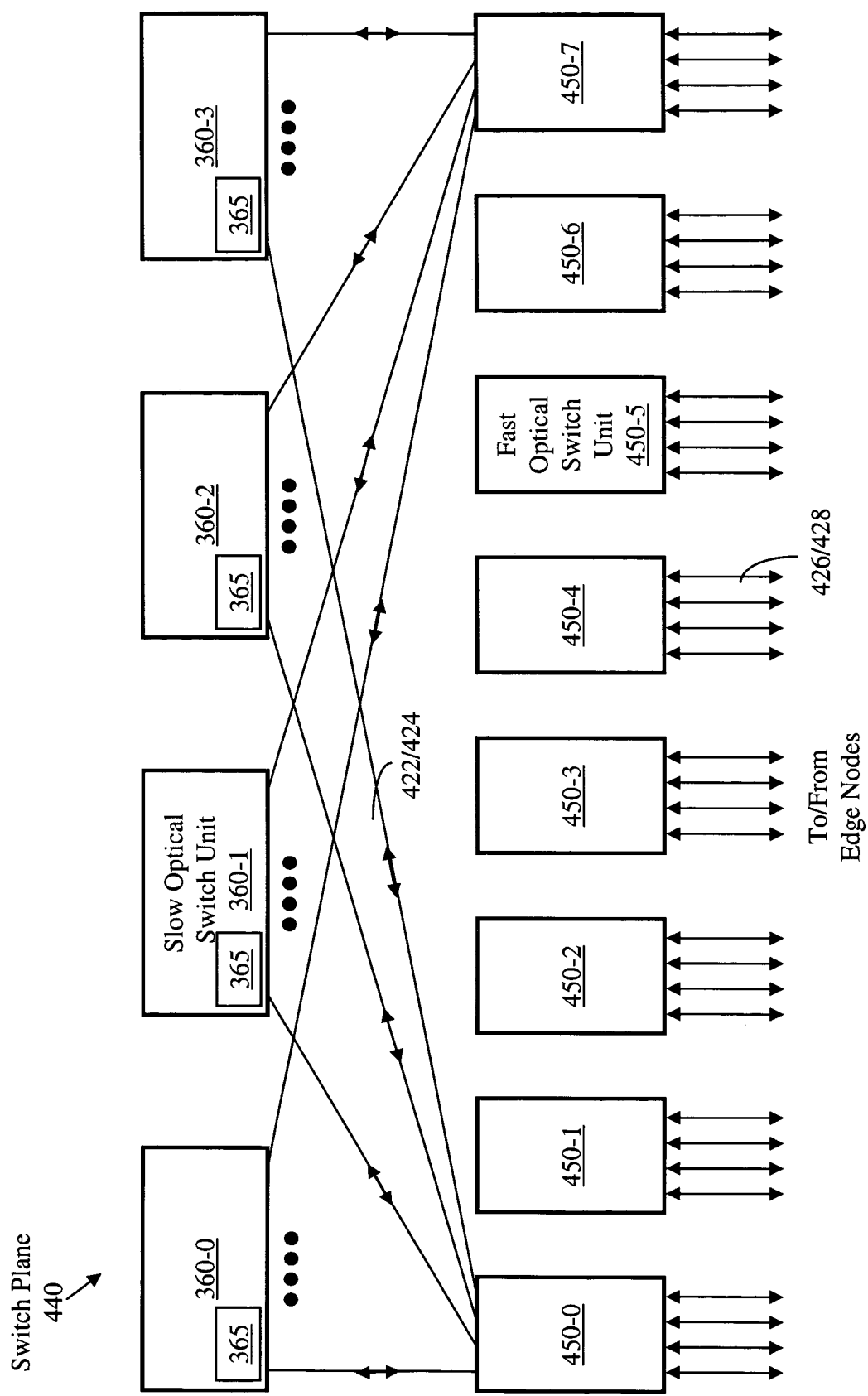
FIG. 4 illustrates a switch plane according to the present invention comprising a plurality of integrated fast optical switch units interconnected through a plurality of inner large-dimension optical switch units.

For example, FIG. 4 illustrates a switch plane 440 according to the present invention, wherein the fast optical switch units 350 and 370 of FIG. 3 are integrated into fast optical switch units 450 (hereinafter referenced collectively as fast switch units 450 or individually as fast switch unit 450). Each fast switch unit 450 is a fully connected switch unit having inlet ports receiving traffic from edge nodes through channels 426, outlet ports transmitting traffic to edge nodes through channels 428, outward ports transmitting traffic to large-dimension slow optical switch units 360 through channels 422, and inward ports receiving traffic from large-dimension switch units 360 through channels 424. Each slow optical switch unit 360 has a configuration controller 365, as described above with reference to FIG. 3. Configuration controllers 365 in switch plane 440 receive connectivity instructions from a controller of switch plane 440 (not illustrated). If the dimension of a fast switch unit 450 is limited to 64×64, for example, and allocating half the input and output ports to connect to the large-dimension switch units 360, the dimension of switch plane 440 is reduced to half the dimension of the switch plane 340 of FIG. 3. That is, the number of inlet ports or outlet ports of switch plane 440 would be 32×2048=65,536 (with the dimensions of fast switch units 450 and slow switch units 360 being 64×64 and 2048×2048, respectively). Although a switch plane 440 scales to half the dimension of a switch plane 340 using similar (but fewer) switch units, switch plane 440 has the advantage that some of the traffic arriving at a fast switch unit 450 through a channel 426 can be switched to a channel 428 on the same fast switch unit 450, thereby bypassing the large-dimension switch units 360 altogether.

Switch planes of the present invention can be substituted for switch planes 140 of FIGS. 1 and 2 to create optical-core networks of fine granularity that are scalable to global coverage and a capacity of the order of hundreds of petabits per second. Thus, the access capacity of these optical-core networks of the present invention may scale to ten-thousand times the access capacity of the current Internet. Due to its structural simplicity, networks of the present invention can employ simplified and robust routing schemes.

The network of the present invention is based on a method of switching signals through an outer stage comprising fast optical switch units, which may be of small dimension, and an inner stage comprising large-dimension optical switch units which may have a large latency. Signals received at a switch plane may be switched through a first plurality of switch units connecting to source edge nodes and capable of fast reconfiguration, a second plurality of inner switch units operating at a low reconfiguration rate, and a third plurality of switch units connecting to destination edge nodes and capable of fast reconfiguration. A switch unit from the first plurality of switch units and a switch unit from the third plurality of switch units may be integrated as described above. The reconfiguration rate of a fast optical switch unit may be at least an order of magnitude faster than the reconfiguration rate of a large-dimension optical switch unit. For example each fast optical switch unit in the first plurality and third plurality of switch units may be capable of changing connectivity (reconfiguring) at a rate exceeding one million reconfigurations per second while a large-dimension optical switch unit may reconfigure at a rate of 10 reconfigurations per second. It is noted that in order to reduce switch-utilization loss due to switching latency, the minimum reconfiguration interval of a switch unit may be selected to be substantially higher than the switching latency of the switch unit. Thus, if the latency of a fast optical switch unit is 20 nanoseconds, the minimum reconfiguration interval may be 50 times larger, i.e., one microsecond, yielding a maximum reconfiguration rate of one million reconfigurations per second. The actual reconfiguration rates depend mainly of the temporal variations of traffic spatial distributions and, in operation, the rates may be significantly lower than the realizable maximum rate. Thus, a fast optical switch unit capable of reconfiguration in a microsecond may reconfigure every several microseconds if the traffic pattern changes at a lower pace. Likewise, while a large-dimension optical switch unit may be designed for reconfiguration every 100 milliseconds, it may in operation be reconfigured over intervals of seconds or minutes.

Figure 5:
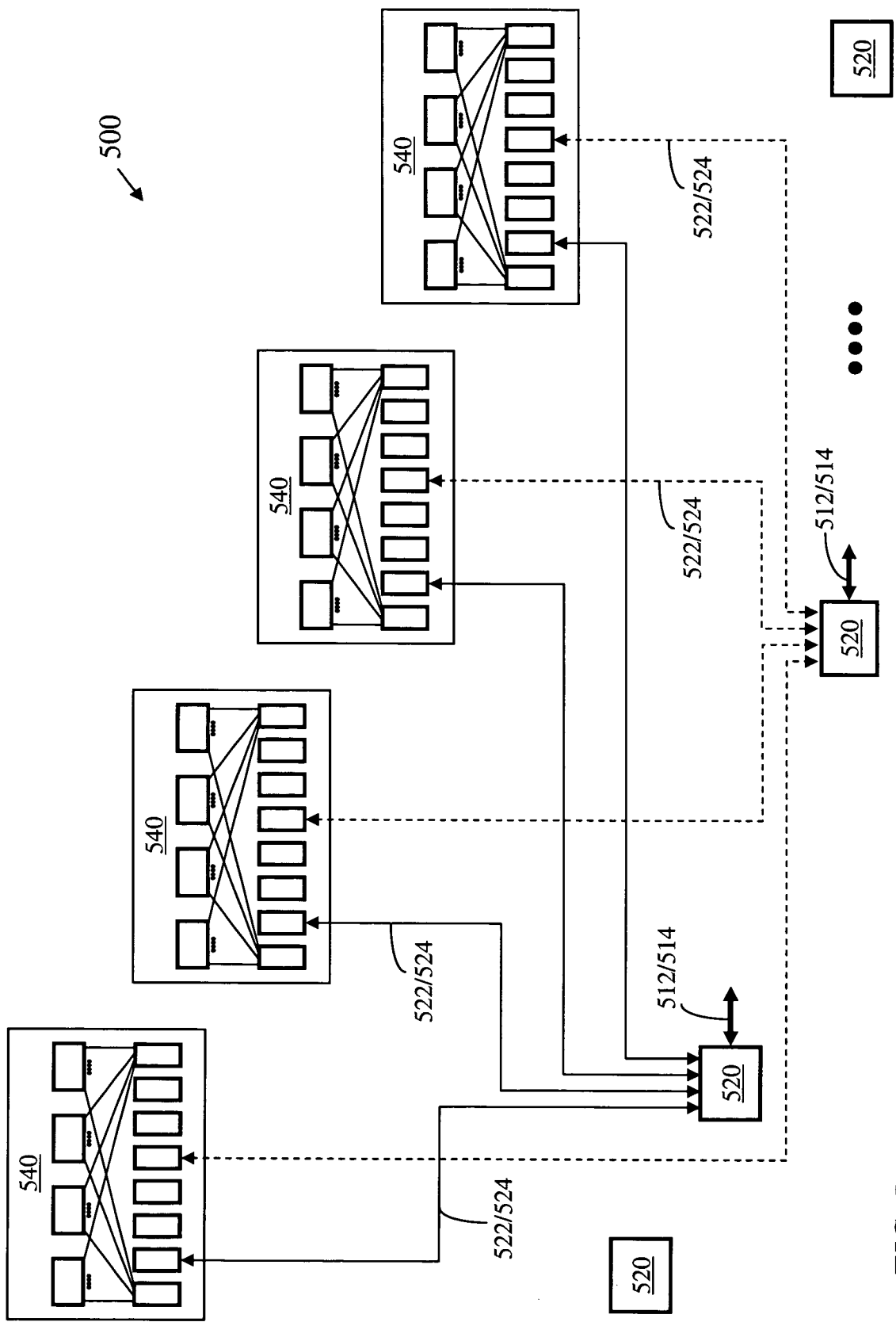
FIG. 5 illustrates a network, in accordance with an embodiment of the present invention, comprising edge nodes interconnected through parallel switch planes where at least one switch plane is of the type illustrated in FIG. 3 or FIG. 4.

FIG. 5 illustrates a network 500 comprising electronic edge nodes 520 interconnected through parallel switch planes 540 where at least one switch plane 540 is of the type of switch plane 340 (FIG. 3) or switch plane 440 (FIG. 4) which comprises fast switch units interconnected by slow switch units. The invention will henceforth be described with switch plane 540 being of the form of switch plane 440, i.e., having integrated fast switch units 450 instead of separate fast switch units 350 and 370. It should be understood, however, that many of the features of the invention can still be realized when switch plane 540 takes the form of switch plane 340 of FIG. 3. Each edge node 520 connects to at least one switch plane 540 through at least one dual channel 522/524. A dual channel 522/524 comprises an upstream channel 522 from an edge node 520 to a switch plane 540 and a downstream channel 524 from a switch plane 540 to the same edge node. An edge node 520 may connect to a plurality of the switch planes 540. An edge node 520 may have a dual channel 522/524 to each of the switch planes 540. Each edge node 520 has a plurality of dual channels 512/514 from/to data sources and sinks.

Each switch plane 540 receives signals from edge nodes 520 at input ports of fast switch units 450 which constitute inlet ports of the switch plane 540 and transmits signals to edge nodes 520 from output ports of fast switch units 450 which constitute outlet ports of the switch plane 540. Each edge node 520 has a plurality of ingress ports capable of receiving traffic from traffic sources through channels 512, a plurality of egress ports capable of transmitting traffic to data sinks through channels 514, a plurality of inbound ports capable of receiving traffic from outlet ports of switch planes 540 through downstream channels 524, and a plurality of outbound ports capable of transmitting traffic to inlet ports of switch planes 540 through upstream channels 522. Thus, network 500 comprises an electronic edge and an optical core, or a predominantly optical core. Edge nodes 520 constitute the electronic edge and switch planes 540 constitute the core.

Each edge node 520 is illustrated in FIG. 5 to be directly connected to switch planes 540 through individual upstream channels 522 and downstream channels 524. Such direct connections may be used in a network 500 of small geographic coverage. In a network of wide geographic coverage, wavelength-division-multiplexing (WDM) may be exploited to transport signals between the edge nodes 520 and the switch planes 540 as will be described below with reference to FIGS. 9 and 10.

Figure 6:
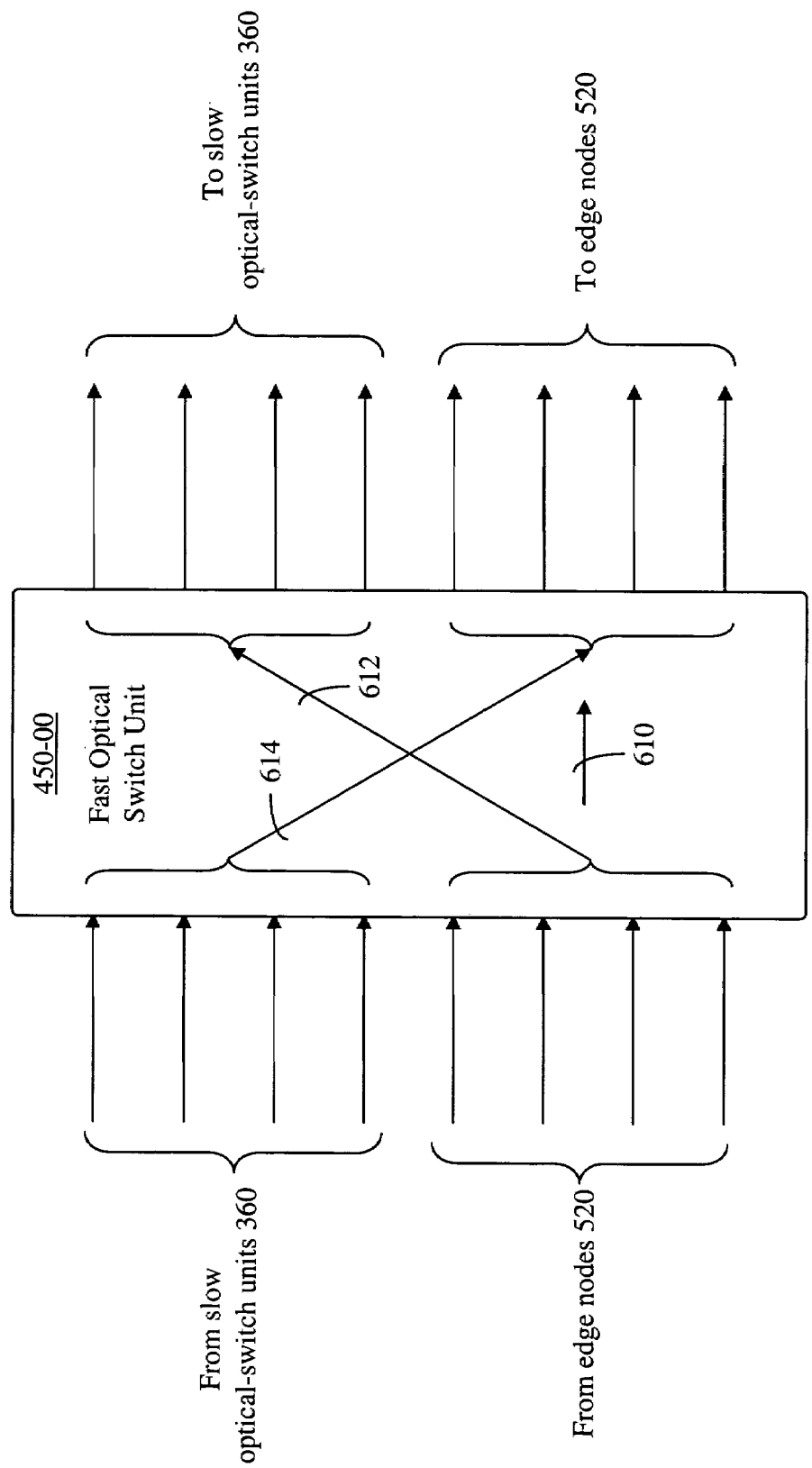
FIG. 6 illustrates connectivity of an integrated fast optical switch unit, in the switch plane of FIG. 4, to edge nodes and inner switch units.

FIG. 6 illustrates an exemplary fast (optical) switch unit 450 having eight input ports and eight output ports. The input ports are divided into four inlet ports connecting to channels from edge nodes 520 and four inward ports connecting to channels from inner slow switch units 360. The output ports are divided into four outlet ports connecting to channels leading to edge nodes 520 and four outward ports connecting to channels leading to inner slow switch units 360. Fast switch unit 450 switches time-limited (time-slotted) optical signals from inlet ports to outlet ports (indicated by arrow 610) or from inlet ports to outward ports (indicated by arrow 612) as well as from inward ports to outlet ports (indicated by arrow 614). Switching from inward ports to outward ports may not be needed. A fast switch unit 450 may have additional ports for connection to controllers as will be described below.

Figure 7B:
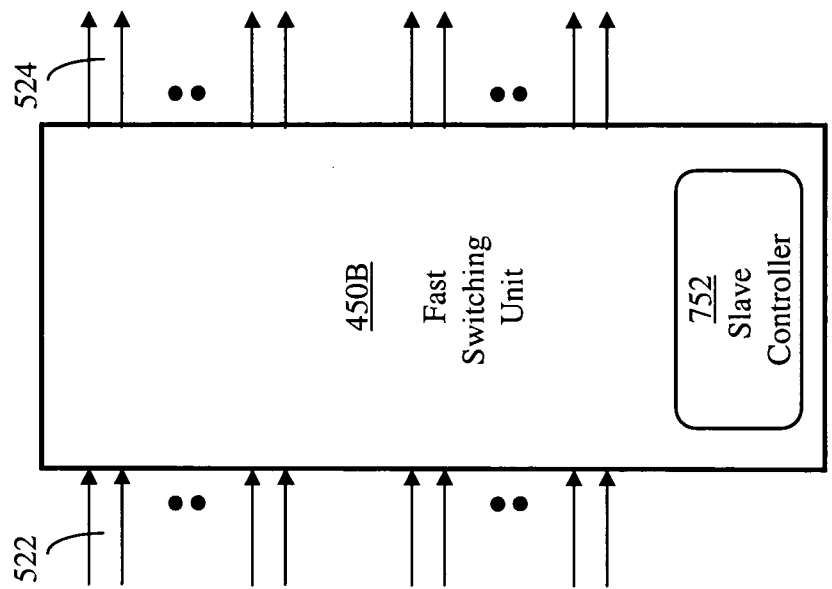
FIGS. 7A and 7B illustrate a first control arrangement in the integrated fast optical switch unit of FIG. 6 corresponding to a case where all the inner switch units are slow optical switch units and a second arrangement where at least one of the inner switch units is an electronic switch unit that supports a switch-plane controller, respectively.
Figure 7A:
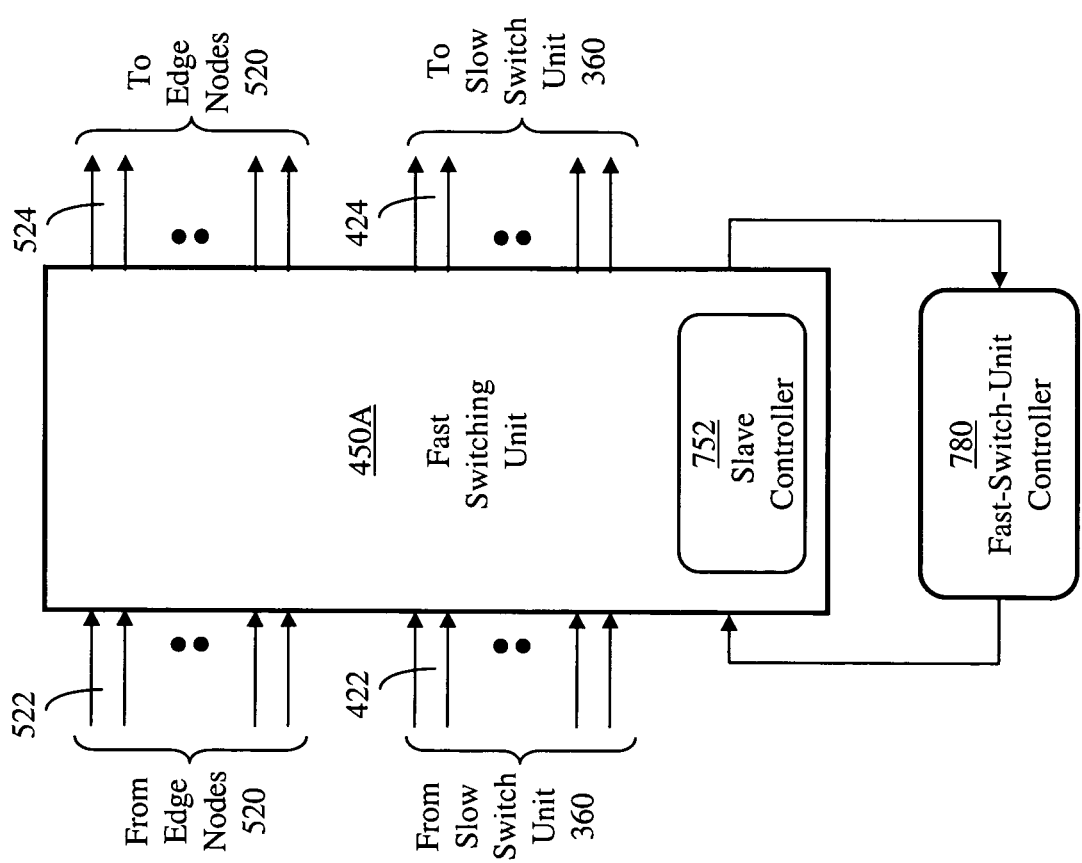

FIG. 7A illustrates controllers of a fast switch unit 450 in a switch plane 540. In a first embodiment, each fast switch unit 450 (identified as 450A) may have a controller 780 connecting to an input port and an output port of the fast switch unit 450A. The edge nodes 520 exchange control signals with controller 780 through the switch unit. This requires precise time coordination as will be described below with reference to FIGS. 17 and 18. In a second embodiment shown in FIG. 7B, a number of fast switch units 450 (identified as 450B) may access a switch-plane controller (not illustrated) through an inner electronic switch unit as will be described below with reference to FIG. 15. In either case, each switch unit 450A or 450B has a configuration controller 752, which is a slave controller receiving connectivity instructions from a master controller, which is either controller 780 of FIG. 7A or the switch-plane controller used for the embodiment illustrated in FIG. 7B.

Edge-Core Connectivity

An electronic signal at each outbound port of an edge node 520 modulates an optical carrier and occupies a respective wavelength channel in a fiber link. A modulated optical carrier received at an inbound port of an edge node 520 from a switch plane 540 is processed to detect the modulating signal which is then switched through the edge node 520 to a respective egress port.

Figure 8:
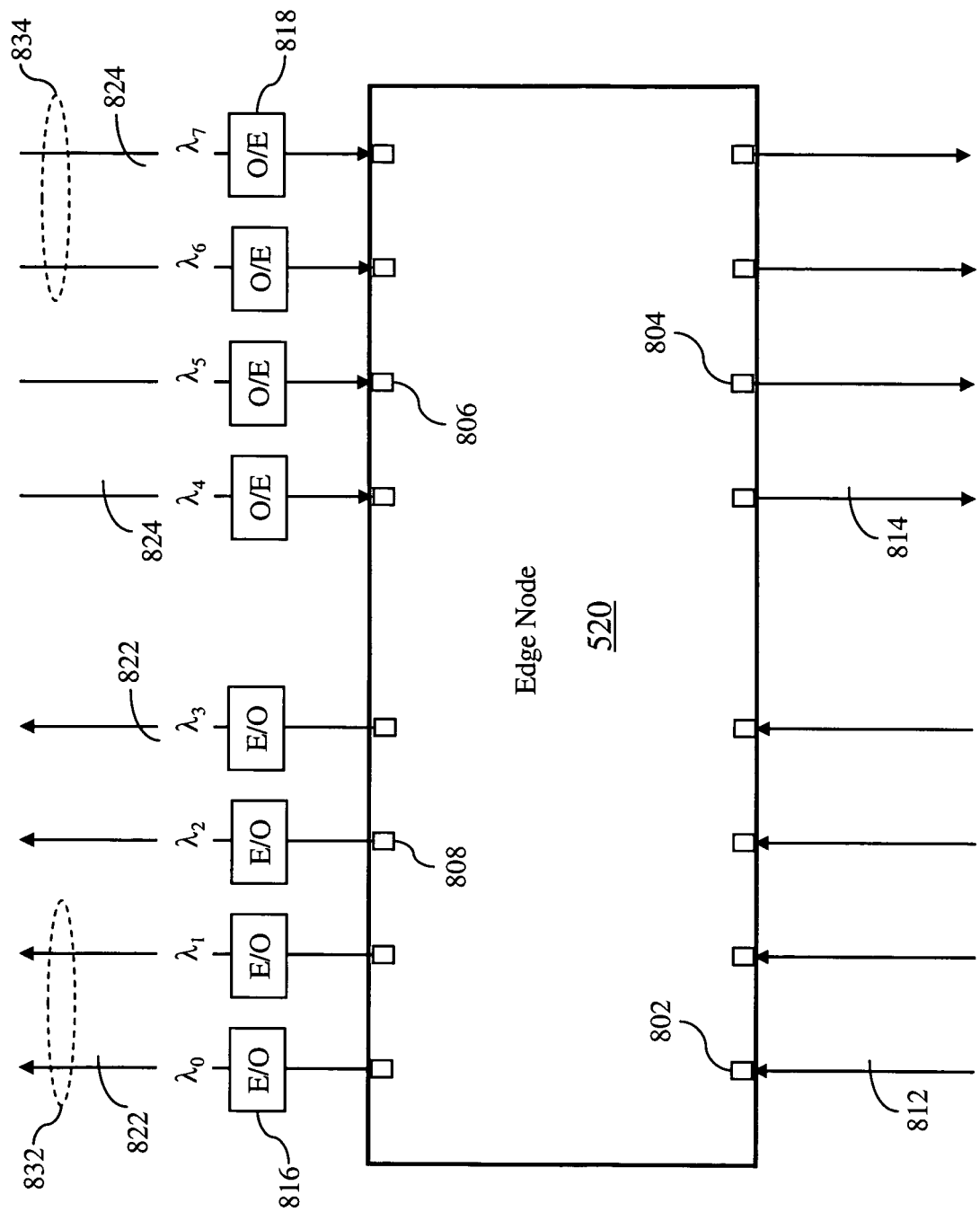
FIG. 8 illustrates an integrated edge node connecting to data sources and sinks and wavelength channels to and from the switch planes of FIG. 5.

FIG. 8 illustrates an integrated edge node 520 having ingress ports 802, egress ports 804, inbound ports 806, and outbound ports 808. The ingress ports 802 receive signals from data sources (not shown). The egress ports transmit signals to data sinks (not shown). The inbound ports 806 receive signals from outlet ports of switch planes 540 through wavelength channels 824 and optical-to-electrical (O-E) converters 818. The outbound ports 808 transmit signals to inlet ports of switch planes 540 through electrical-to-optical (E-O) converters 816 and wavelength channels 822. It is noted that channels 822 and 824 become synonymous to channels 522 and 524, respectively, if an edge node 520 is directly connected to switch planes 540. Upstream wavelength channels 822 may be multiplexed into upstream WDM links 832 and downstream wavelength channels 824 may be multiplexed into downstream WDM links 834.

Figure 9:
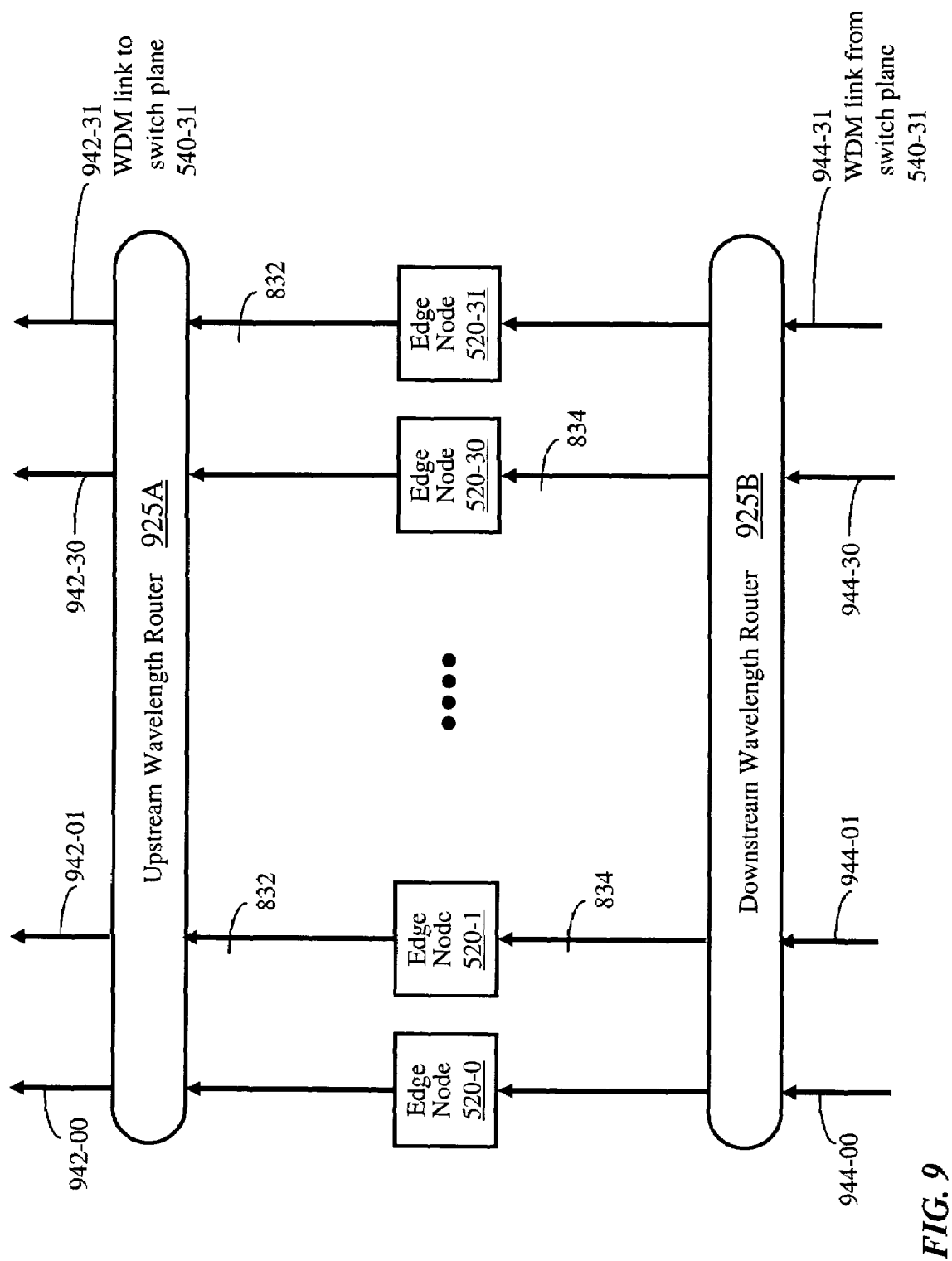
FIG. 9 illustrates an upstream wavelength router and a downstream wavelength router connecting a set of edge nodes to different switch planes in the network of FIG. 5.

FIG. 9 illustrates wavelength routers 925 to link edge nodes 520 to switch planes 540. An upstream wavelength router 925A distributes wavelength channels of each upstream WDM link 832 received from each edge node 520, within a group of edge nodes, among WDM links 942 directed to switch planes 540 so that each WDM link 942 includes a wavelength channel from each upstream WDM link 832. WDM links 944, each carrying signals from a switch plane 540 directed to the edge-node group, are connected to a downstream router 925B which distributes wavelength channels to downstream WDM links 834 so that each WDM link 834 includes one wavelength channel from each WDM link 944. In this example, the edge node group comprises 32 edge nodes 520-0, 520-1, to 520-31 and each edge node 520 has 32 outbound ports and 32 inbound ports, thus requiring 32 upstream wavelength channels 822 (toward switch planes 540) and 32 downstream wavelength channels 824 (from switch planes 540). A basic wavelength router 925A or 925B may have a relatively small dimension; 32×32 in this example. Composite wavelength routers of higher dimension can be constructed by cascading basic wavelength routers. The need for a wavelength router of higher dimension arises when the edge nodes 520 are of higher dimension. However, instead of using composite wavelength routers of large dimension, it would be simpler to divide the upstream channels 822 (FIG. 8) of an edge node 520 of large dimension into upstream channel groups each connecting to an independent basic wavelength router 925A. Likewise, the WDM channels 944 from a switch plane 540 directed to edge nodes 520 of large dimension may be arranged into downstream channel groups each connecting to an independent basic downstream wavelength router 925B.

Figure 10:
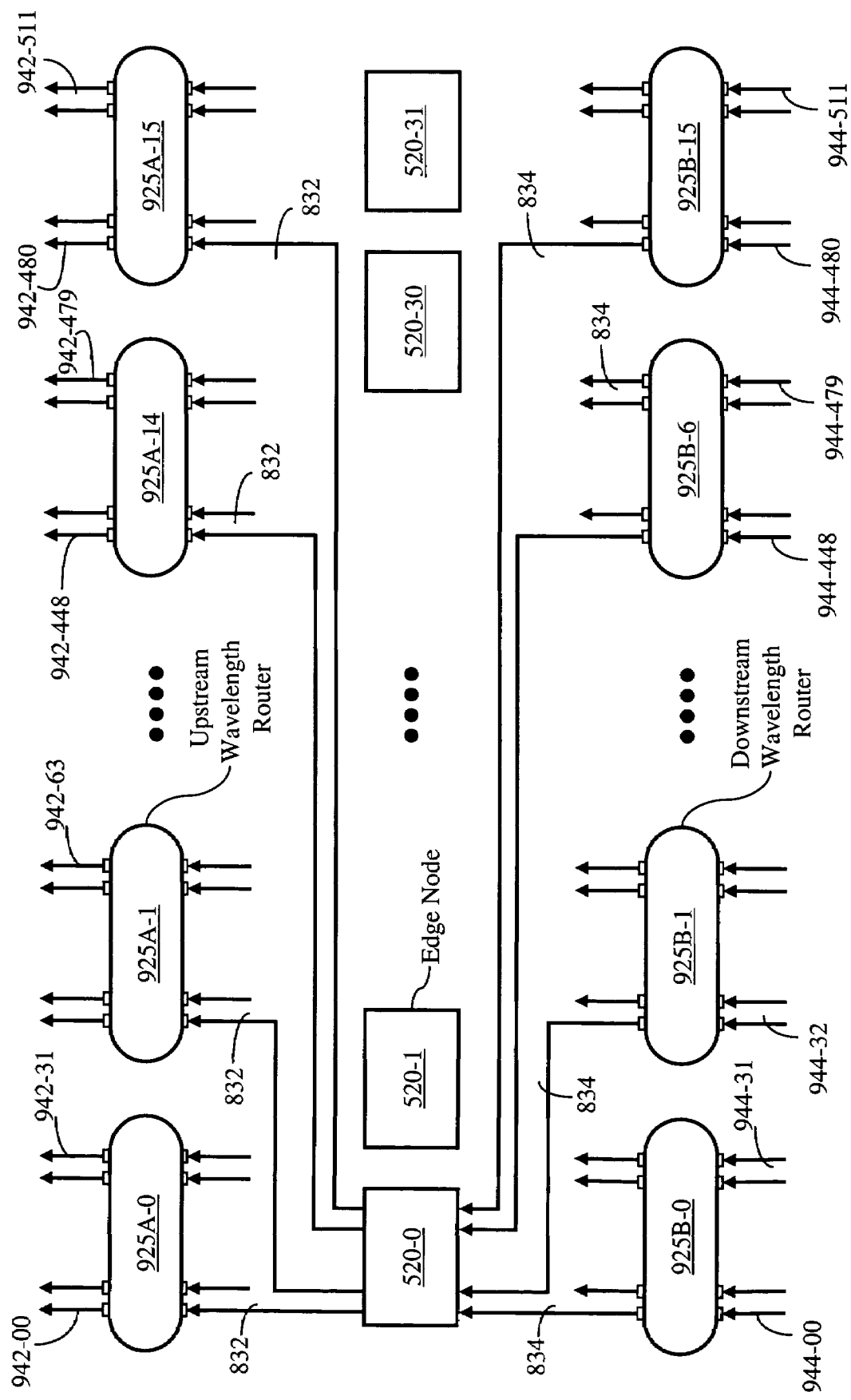
FIG. 10 illustrates the use of a plurality of wavelength routers to connect a set of edge nodes to switch planes and to connect the switch planes to the edge nodes.

FIG. 10 illustrates an arrangement of 16 independent upstream wavelength routers 925A (individually 925A-0, 925A-1, . . . , 925A-15) and 16 independent downstream wavelength routers 925B (925B-0, 925B-1, . . . , 925B-15) to link a group of 32 edge nodes 520-0, 520-1, . . . , 520-31 to a large number, 512, of switch planes 540. In this example, each edge node 520 has 512 outbound ports where each outbound port connects to an upstream channel. The upstream channels of each edge node 520 are arranged into 16 groups, each group comprising 32 channels multiplexed onto an upstream WDM link 832, and each upstream WDM link 832 is connected to an upstream wavelength router 925A. Upstream wavelength router 925A-0 has 32 upstream WDM links 942-00 to 942-31 each directed to one of 32 switch planes 540 which may be distributed over a wide geographic area. Generally, upstream wavelength router 925A-j, where 0≦j<16, may have 32 upstream WDM links 942-(32j) to 942-(32j+31) each directed to one of 32 switch planes 540. Thus, an upstream wavelength router 925A may connect each edge node 520 to 512 switch planes 540. Each of the 16 downstream wavelength routers 925B receives 32 downstream WDM links 944 from switch planes. Each output WDM link of a wavelength router 925B becomes a downstream WDM link 834 which includes a wavelength channel from each of 32 switch planes 540 directed to a single edge node 520. Thus, each edge node 520, having 512 outbound ports and 512 inbound ports, may transmit signals to each of 512 switch planes 540 and receive signals from each of 512 switch planes.

Core Configuration

Figure 11:
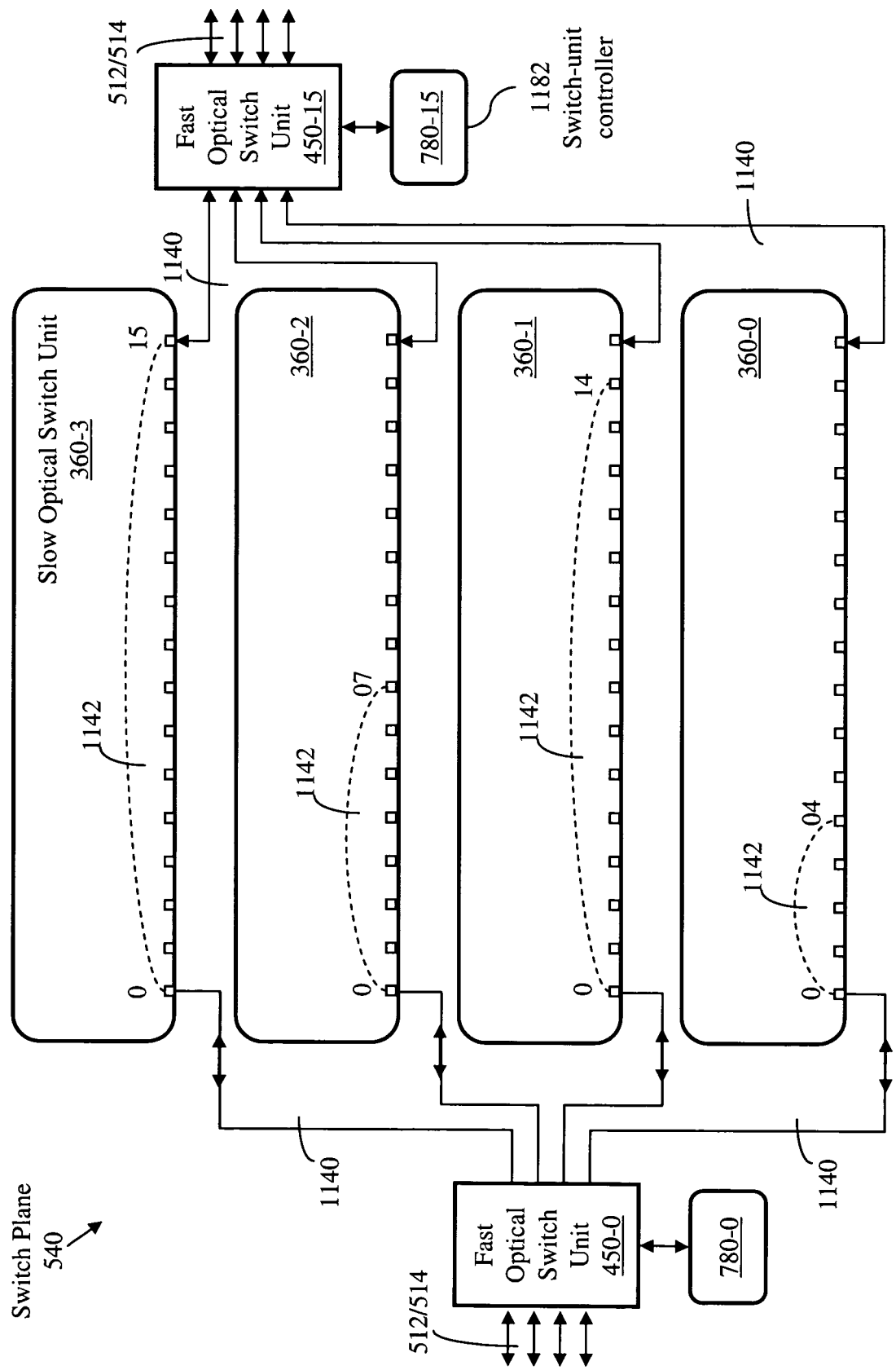
FIG. 11 illustrates an exemplary connectivity of inner slow optical switch units in a first switch plane in the network of FIG. 5.

FIG. 11 illustrates the configuration of slow switch units 360 in a first switch plane 540. To simplify the illustration, only four slow switch units 360-0, 360-1, 360-2, and 360-3, belonging to the switch plane 540 are shown. In FIG. 11 (and in FIG. 12), input ports and output ports of slow optical switch units 360 are illustrated as dual ports. There are 16 dual ports in each slow optical switch unit 360 and, hence, 16 fast switch units 450 may be supported by the switch plane. Based on spatial traffic distribution during a given period of time, the four switch units 360 may be configured so that input port 0 (of dual port 0) of switch unit 360-0 connects to output port 4 (of dual port 4), input port 0 of switch unit 360-1 connects to output port 14, input port 0 of switch unit 360-2 connects to output port 7, and input port 0 of switch unit 360-3 connects to output port 15 of switch unit 360-3 as illustrated in FIG. 11. A fast switch unit 450-0 connects to input port 0 of each of the four switch units 360 through dual channels 1140 and connects to a first group of edge nodes (not shown) via dual links 512/514. A fast switch unit 450-15 connects to port 15 of each of the four switch units 360 through dual channels 1140 and connects to a second group of edge nodes (not shown) via dual links 512/514. Thus, an edge node of the first group of edge nodes can reach any edge node of the second group of edge nodes through an internal path 1142 within switch unit 360-3. Such internal paths 1142 may be modified relatively infrequently to follow variations of spatial traffic distributions. The edge nodes of the first group are also connected to fast switch units 450 of other switch planes 540 and the edge nodes of the second group are also connected to other fast switch units 450 of other switch planes 540. If it happens, under extreme traffic conditions, that the edge nodes of the first and second groups are operating near capacity, and that the traffic from all the edge nodes of the first group connecting to fast switch unit 450-0 is directed to the edge nodes of the second group connecting to fast switch unit 450-15, then port 0 of each of the four switch units 360-0 to 360-3 of the switch plane 540 would be internally connected to port 15 thus providing four paths between the four edge nodes of the first group and the four edge nodes of the second group. Similarly, internal connections in the other switch planes 540 may be set to establish four paths from the first group of edge nodes to the second group of edge nodes. Notably, changes of spatial traffic distributions necessitating corresponding changes of the internal paths 1142 through inner slow switch units 360 of switch planes 540 may take place over relatively long periods of time, with an interval between successive changes plausibly exceeding several seconds.

Figure 12:
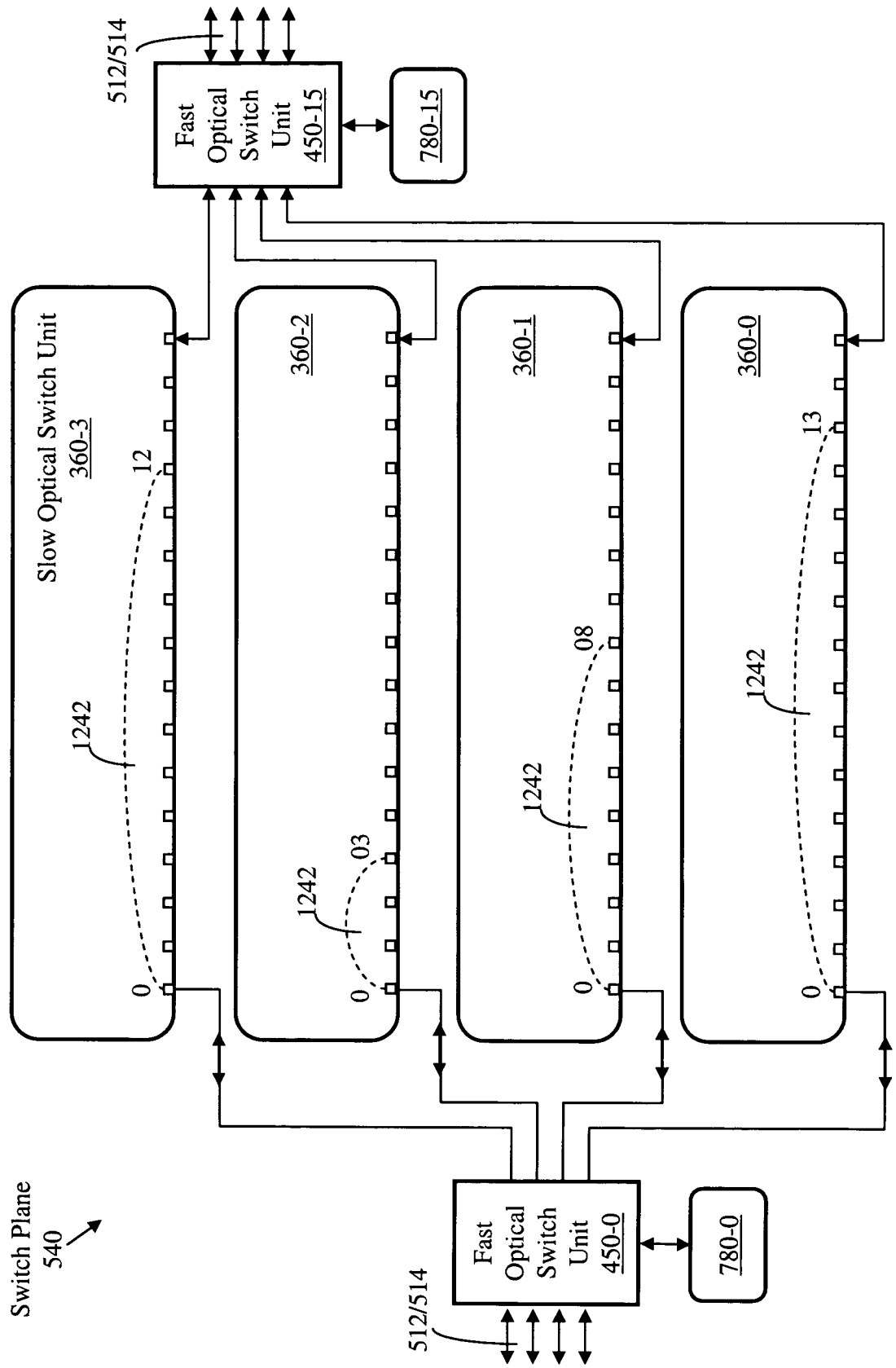
FIG. 12 illustrates an exemplary connectivity of inner slow optical switch units in a second switch plane in the network of FIG. 5.

FIG. 12 illustrates the configuration of slow switch units 360-0, 360-1, 360-2, and 360-3, belonging to a second switch plane 540. In this example, internal paths 1242 set through the four inner slow switch units 360 of the second switch plane 540 provide a different connectivity pattern. The edge nodes connecting to fast switch unit 450-0 cannot connect to edge nodes connecting to fast switch unit 450-15 through the second switch plane. It is noted that the edge nodes connecting to fast switch unit 450-0 of the second switch plane 540 may differ from the above first group of edge nodes connecting to fast switch unit 450-0 of the first switch plane 540. Generally, edge nodes connecting to fast switch unit 450-j of the first switch plane may not necessarily connect to fast switch unit 450-j, where 0≦j<16, of the second switch plane.

Network Control

Figure 13:
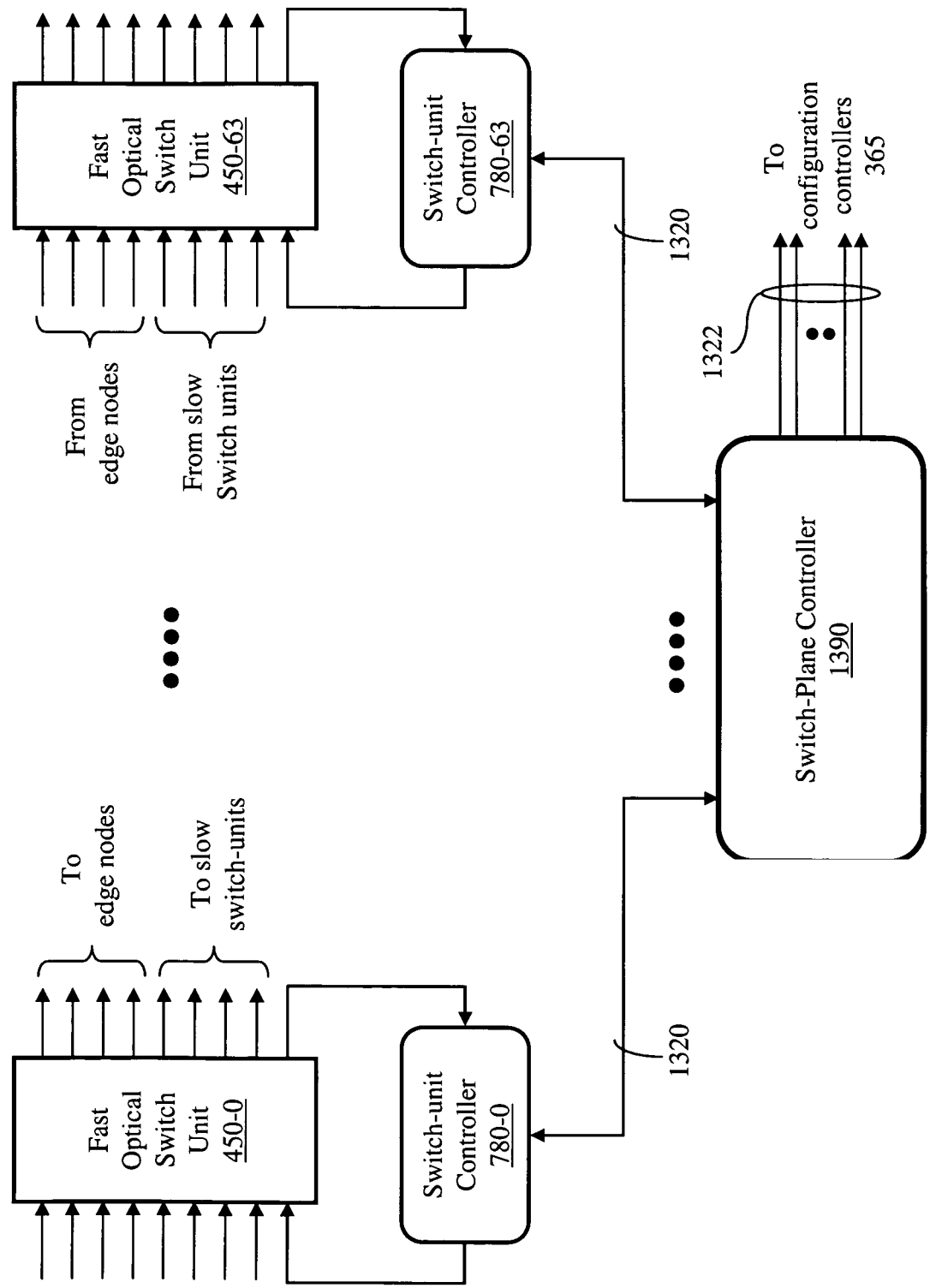
FIG. 13 further details the control arrangement of FIG. 7A and introduces a switch plane controller, for use in a network of the type illustrated in FIG. 5, having inner switch units of moderate dimensions, in accordance with an embodiment of the present invention.

FIG. 13 illustrates a control system of a switch plane 540 which includes a moderate number, 64, of fast switch units 450-0 to 450-63 forming a switch-unit group. Each fast switch unit 450-j has a switch-unit controller 780-j, where 0≦j<64. A switch-unit controller 780-j, connected to a fast switch unit 450-j, communicates with edge nodes (not shown) connecting to the fast switch unit 450-j and schedules connections that can be completed within the fast switch unit. To enable conflict-free scheduled connections despite the absence of buffers at input ports of fast switch units 450, a time locking process is performed through the exchange of timing signals between each switch-unit controller 780-j, associated with fast switch unit 450-j, where 0≦j<64, and controllers of edge nodes 520 connecting to the fast switch unit 450-j. Each of the 64 switch-unit controllers 780-j has a bidirectional channel 1320 to a group controller which serves as a switch-plane controller 1390. Switch-plane controller 1390 schedules connections between the fast-optical switch units 450 and performs other control functions. As described above, with reference to FIGS. 3 and 4, each slow optical switch unit 360 has a configuration controller 365 which is a slave controller that receives connectivity instructions from a switch-plane controller. In the control configuration of FIG. 13, configuration controllers 365 of switch plane 540, having the form of switch plane 440 of FIG. 4, receive instructions from switch-plane controller 1390 to set internal paths, such as paths 1142 and 1242. Switch-plane controller 1390 connects to a configuration controller 365 of each slow optical switch unit 360 in switch plane 540 through a channel 1322.

Figure 14:
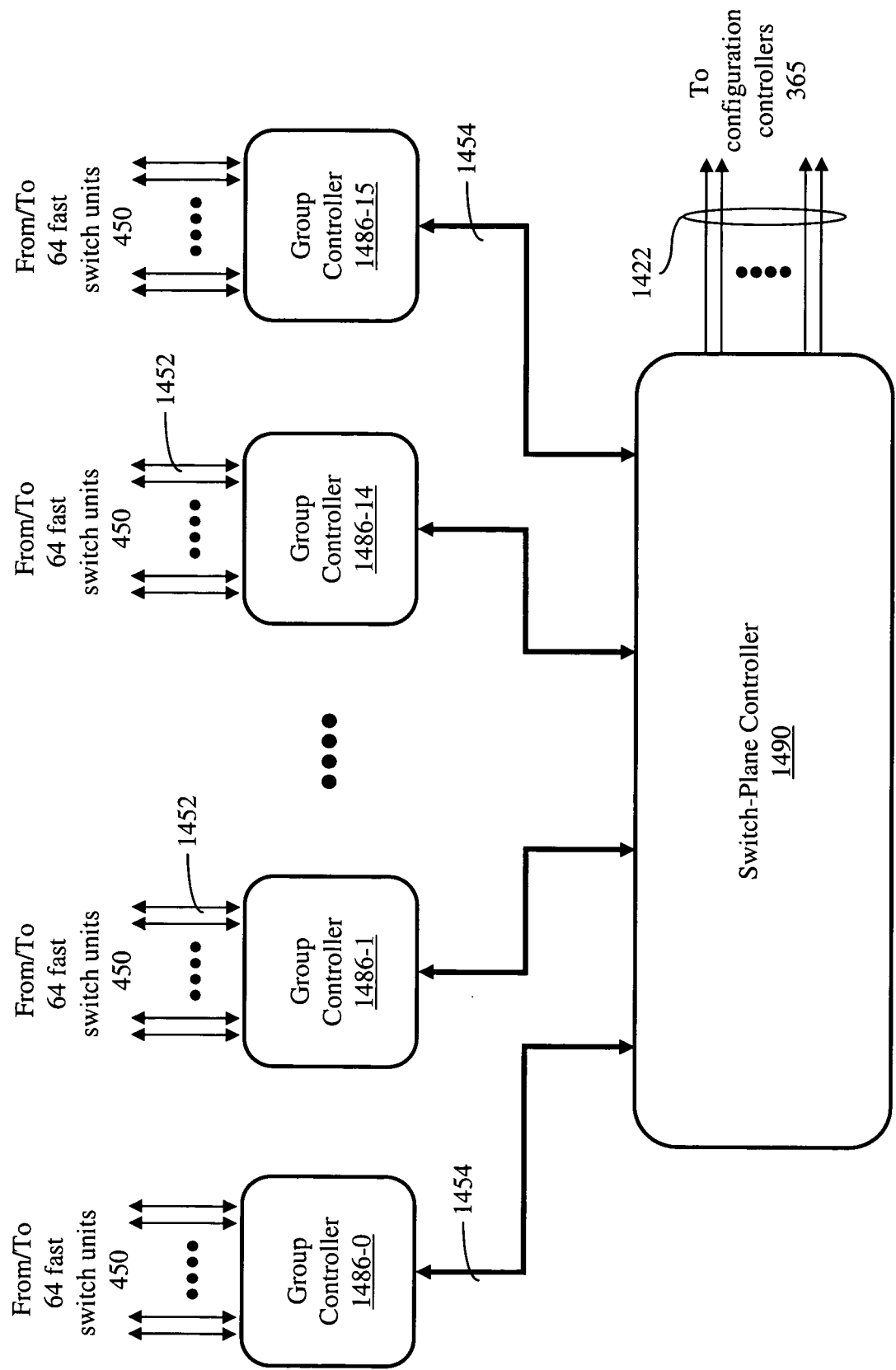
FIG. 14 further details the control arrangement of FIG. 7A, introducing a plurality of group controllers connecting to a switch plane controller, for use in a network of the type illustrated in FIG. 5, having inner switch units of large dimensions, in accordance with an embodiment of the present invention.

FIG. 14 illustrates a control system of a switch plane 540 which comprises a large number, 1024, of fast switch units 450. The fast switch units 450 are grouped into 16 switch-unit groups each comprising 64 fast switch units 450 which share a group controller 1486 and each fast switch unit 450 has a bidirectional channel 1452 to the group controller 1486. Each of the 16 group controllers 1486 (individually 1486-0, 1486-1, . . . , 1486-15) has a bidirectional link 1454 (which may comprise multiple channels) to a switch-plane controller 1490 which schedules connections between fast switch units 450 belonging to different fast switch-unit groups. In the control configuration of FIG. 14, configuration controllers 365 of switch plane 540 (having the form of switch plane 440) receive instructions from switch-plane controller 1490 to set internal paths, such as paths 1142 and 1242. Switch-plane controller 1490 connects to a configuration controller 365 of each slow optical switch unit 360 in switch plane 540 through a channel 1422.

Figure 15:
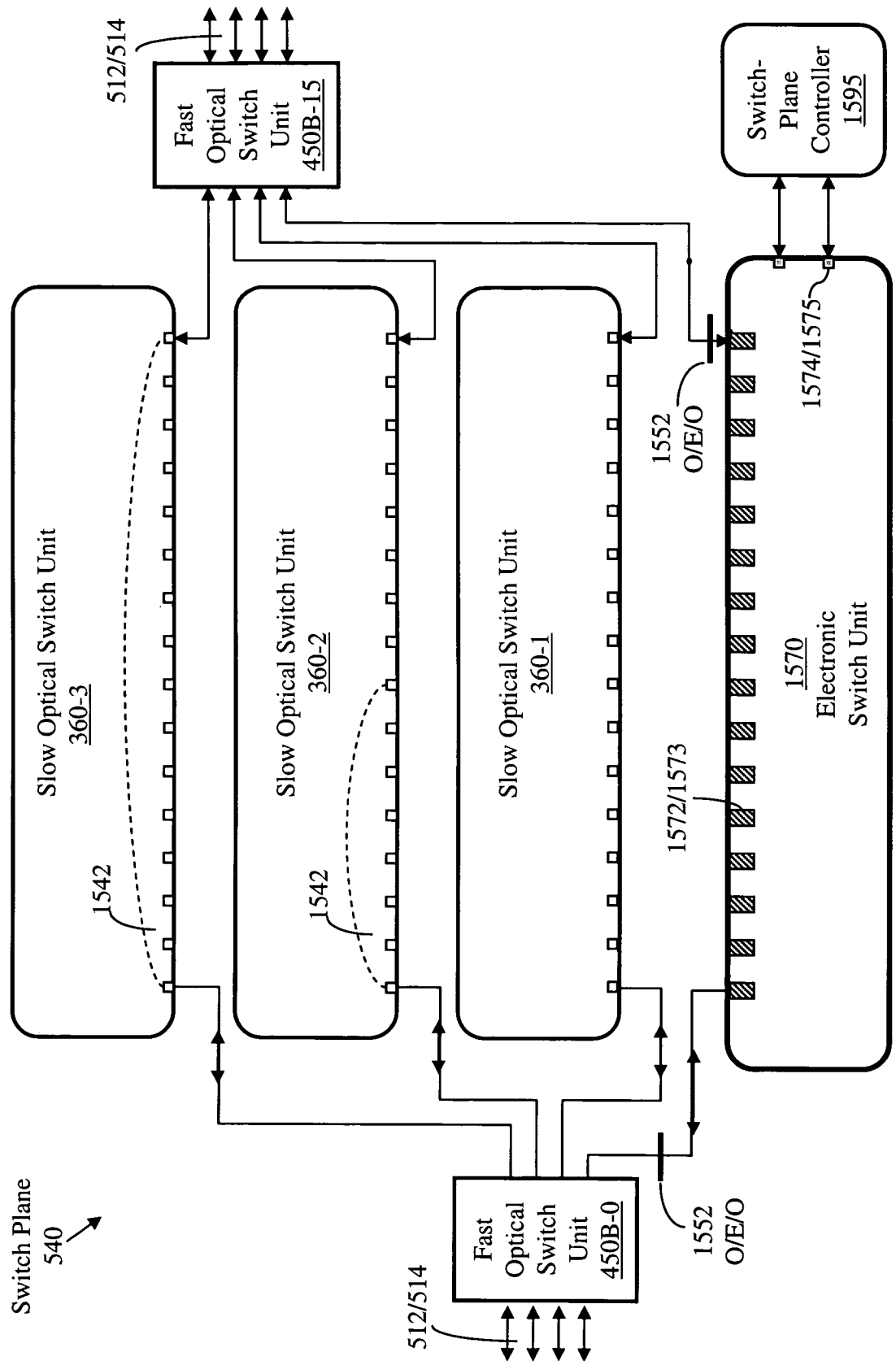
FIG. 15 illustrates an exemplary switch plane in a network of the type illustrated in FIG. 5, the switch plane including one inner electronic switch unit supporting a switch-plane controller in accordance with an embodiment of the present invention.

FIG. 15 illustrates an alternative switch plane 540 in a network 500. The switch plane 540 includes 16 fast switch units 450 interconnected through three inner slow optical switch units 360 (individually 360-1, 360-2, and 360-3) and one inner electronic switch unit 1570 with which a switch-plane controller 1595 is associated. Exemplary internal paths 1542 within the slow optical switch units, similar to internal paths 1142 of FIG. 11, are indicated. The electronic switch unit 1570 has 16 dual ports 1572/1573 (each dual port includes an input port 1572 and an output port 1573) and two dual control ports 1574/1575 (each includes an input port 1574 and an output port 1575) connecting to the switch-plane controller 1595. Each modulated optical carrier signal received at each input port 1572 of the electronic switch unit 1570 is processed by an O-E converter to detect the modulating signal which is switched through the electronic switch unit 1570 to either an output port 1573 connecting to a fast switch unit 450 or to control port 1575 connecting to switch-plane controller 1595. At each output port 1573, switched electronic signals modulate an optical carrier in an electronic-to-optical (E-O) converter. The O-E and E-O converters are represented in FIG. 15 as O-E-O interface 1552. Due to the fast-switching capability of electronic inner switch unit 1570, the fast switch units 450 may not need to have their own switch unit controllers. The fast switch units 450 are collocated with the electronic inner switch unit 1570 and, hence, each of the edge nodes 520 connecting to the entire switch plane 540 may time lock to a master time indicator (time counter) associated with switch-plane controller 1595.

In a switch plane 540 where each inner switch unit is a slow optical switch unit 360 (FIGS. 11 and 12), each edge node 520 has a reserved path, during a corresponding time slot, to a switch-unit controller 780. In a switch plane 540 where at least one of the inner switch units is an electronic switch unit 1570 supporting a switch-plane controller 1595, each edge node 520 has a reserved path, during a corresponding time slot, to the switch-plane controller 1595. Electronic switch unit 1570 may be either a space switch without buffers at its input or output ports, or a stand-alone switch which includes buffers, at least at input. Regardless of the type of electronic switch 1570, the control path from each edge node to the switch-plane controller 1595 is reserved.

The number of dual control ports 1574/1575 connecting to switch-plane controller 1595 in the electronic switch unit 1570 is determined according to the number of edge nodes connecting to the switch plane 540. The maximum number of edge nodes that may connect to a switch plane 540 having K fast switch units 450, where each fast switch unit 450 has n outer dual ports, each outer dual port connecting to one of n edge nodes 520, and m inner dual ports, each inner dual port connecting to one of m inner switch units, is n×K. If each edge node is assigned only one control timeslot per time frame per switch plane 540, and considering a time frame comprising ν time slots, the needed number χ of dual control ports 1574/1575 is $\chi = \lceil (n \times K)/\nu \rceil$, where $\lceil . \rceil$ denotes rounding up. For example, a switch plane 540 having 1024 fast switch units (K=1024), each having 32 outer dual ports (n=32) supports a maximum of 32768 edge nodes. Selecting ν=1024 time slots per time frame, then the required number of control ports 1574/1575 is χ=32. The dimension of each slow optical switch unit in the switch plane 540 is then 1024×1024 while the dimension of the electronic switch unit 1570 is (1024+32)×(1024+32). It is noted that a switch unit 1570 may switch payload data, from any of its K input ports 1572 to any of its K output ports 1573, as well as control data from any of its K input ports 1572 to a corresponding control port 1575 and from any of the χ control ports 1574 to corresponding output ports 1573. The switch-plane controller 1595 may perform time-locking, scheduling, and other control functions for the entire switch plane 540.

As described above, electronic switch unit 1570 may be either a bufferless space switch or a stand-alone switch which includes at least input buffering. Scheduling a connection through a space switch having no input buffers requires a third-order time-slot matching process. Employing a stand-alone electronic switch unit reduces the third-order time-slot matching process to much simpler three decoupled first-order time-slot-matching processes: a first order matching process to schedule a first segment of a connection through the originating fast switch unit 450; a first-order time-slot matching process to schedule a second segment of the connection through the stand-alone electronic switch; and a third time-slot matching process to schedule a third segment of the connection through the destination fast switch unit 450. Because of the availability of a buffering facility at input and output of the stand-alone electronic switch unit 1570, the three connection segments are decoupled and may be established independently. Without such buffering facility, the three connection segments need be either contemporaneous or having a specific temporal relationship, thus requiring a third-order time-slot matching process.

A space switch 1570 may be constructed either as an instantaneous space switch or a latent space switch. In an instantaneous space switch, a data unit is transferred from any input port to a target output port during the same time slot at which the data unit is received. In a latent space switch, a data unit received at an input port during a given time slot is transferred to a target output port after a deterministic delay. It is important to note that a latent space switch is not a time switch; in a time switch, a data unit stored in a memory device may be read out at an arbitrary instant of time while in a latent space switch the switching latency is deterministic. An instantaneous space switch is difficult to scale as a single-stage switch and may be implemented as a multi-stage structure which results in increasing the scheduling processing effort. A latent space switch, which in effect functions as a single-stage space switch, may be implemented as an array of memory devices interconnecting an input rotator to an output rotator. The input rotator has input ports which constitute the input ports of the latent space switch and output ports each of which transfers data to one of the memory devices. The output rotator has input ports each of which transfers data from one of the memory devices and output ports which constitutes the output ports of the latent space switch. The deterministic switching delay is a function of the spatial positions of an input port and an output port of the latent space switch. Such a structure is virtually indefinitely scalable and the only practical limitation is the magnitude of permissible delay. The maximum deterministic delay is determined as the number of dual ports (an input port and an output port) multiplied by the duration of a time slot. With a time-slot duration of 200 nanoseconds, for example, and a permissible latency of one millisecond, the latent space switch described above scales to 5000×5000. (U.S. Pat. No. 6,876,649 describes a network using a latent space switch at the core.) It is noted that in a network 500, a data unit from a source edge node 520 to a sink edge node 520 traverses only one switch plane 540 and, hence, a deterministic latency of several milliseconds may be permissible.

A stand-alone space switch may be implemented as an input-buffered space switch or, preferably, as a circulating switch, which scales to very high dimensions, as described in U.S. patent application Ser. No. 10/780,557 (Publication No. 2004-0165887).

The total number of dual ports of a fast switch unit 450 is limited by design constraints. As described above, the dual ports of a fast switch unit 450 are divided into a number n of outer dual ports connecting to edge nodes 520 and a number m of inner dual ports connecting to inner slow optical switch units 360 and possibly to electronic switch units 1570. In order to facilitate the second-order time-slot-matching process, and reduce mismatch probability, for connections traversing two fast switch units 450, the occupancy of the inner ports may be reduced. The mean occupancy of the inner dual ports (the inward ports and outward ports) may be less than the mean occupancy of outer dual ports (the inlet ports and outlet ports) of a fast switch unit 450 due to potential internal switching through the fast switch unit 450 between edge nodes 520 connecting to the same fast switch unit 450. The occupancy of the inner ports may further be reduced by allocating more dual inner ports than dual outer ports, i.e., by selecting m to be larger than n. For example, if a fast switch unit 450 has 64 dual ports (m+n=64), and selecting n to be 30 and m to be 34, an internal expansion (also called traffic dilation) of 34/30 is realized. This means that, even without internal switching through individual fast switch units 450, the mean occupancy of inner ports is reduced to 0.88 times the mean occupancy of the outer ports.

Two types of switch planes have been described above. In the first type, the switch plane core comprises slow optical switch units of large dimension as illustrated in FIG. 11. In the second type, the switch-plane core comprises slow optical switch units of large dimension and at least one electronic switch unit of large dimension as illustrated in FIG. 15. The two types have different control structures. A network 500 may comprise numerous switch planes 540 which need not be of the same type.

Global Time Coordination

In conventional networks using electronic switching nodes in the core, each switching node having multiple input ports and multiple output ports, buffers are used at input ports of a switching node to decouple the switching node from preceding traffic sources, which may be simple multiplexers, traffic concentrators, or other switching nodes. Decoupling is needed for two main reasons: the first is to align data units receive from uncoordinated geographically-distributed traffic sources; and the second is to resolve contention when two or more input ports vie for a common output port. In the optical-core network 500 of the present invention, modulated optical-carrier signals are received from edge nodes at a bufferless inlet port of a fast switch unit 450. To realize the two essential functions of time alignment and contention resolution despite the absence of buffers at the inlet ports in the core, the buffering process is performed at the electronic edge nodes 520. The edge nodes 520 may be distributed over a wide geographic area with significantly varying propagation delays from any of the switch planes 540. To realize time alignment, each switch plane 540 provides an independent time reference determined by a time indicator such as a cyclic time counter. A cyclic time counter is a clock-driven counter which indicates time as a count of clock pulses. If the cyclic time counter has a word-length of 24 bits, the cyclic time counter indicates time as a number varying between 0 and $2^{24}-1$ (i.e., 0 to 16,777,215). If the clock period (the time between two successive clock pulses) is 32 nanoseconds for example, the time-counter period (which is the duration of each time-counter cycle) would be 536 milliseconds (16777216 times 32 nanoseconds), which is larger than the propagation delay between any two points in a network 500 of global coverage.

The time indicator of a switch plane provides a master time reference. The switch units (450, 360, 1570) of each switch plane 540 are collocated and, therefore, they have the same time reference. Each outbound port of each edge node 520 has a slave time counter which is identical to the master time counter of the switch plane 540 to which the outbound port connects (two time counters are said to be identical if they have the same clock rate and the same time-counter period). Preferably, all master time indicators (master time counters) of all switch planes are identical and, therefore, all master time counters and slave time counters in the entire network 500 are identical. It is emphasized, however, that the master time counters of different switch planes 540 are naturally independent and each provides an arbitrary time reference.

Each master time indicator (master time counter) is associated with a master time-locking circuit and each slave time indicator (slave time counter) is associated with a slave time-locking circuit. Each slave time-locking circuit exchanges time indications (time-counter readings) with a corresponding master time locking circuit and may reset its associated slave time indicator (slave time counter) according to the exchanged time indications. The exchange of time indications is performed periodically, for example every 100 milliseconds, so that each slave time indicator remains time-locked to its master time indicator despite potential changes in the propagation delay from the slave time indicator to its master time indicator.

The master time indicator may be embedded in controllers 1390 or 1490 of a switch plane 540 in which each fast switch unit 450 (450A) has a switch-unit controller 780 (FIG. 13 and FIG. 14). In this case, each switch-unit controller preferably has its own time-locking circuit and the time-locking circuits of all switch-unit controllers of the switch plane 540 are associated with the same master time indicator. In a switch plane 540 which employs an inner electronic switch unit 1570, the switch-plane controller 1595 may include a master time indicator and several time-locking circuits.

Scheduling

Figure 16:
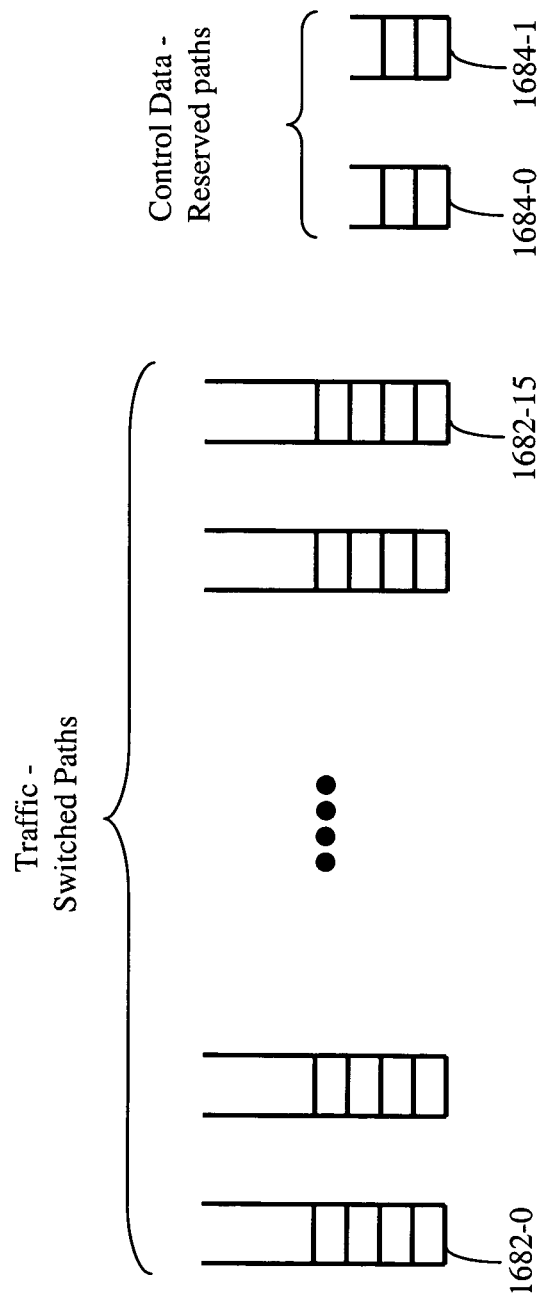
FIG. 16 illustrates multiple logical queues maintained by each input port of the inner electronic switch unit of FIG. 15, the queues including user-data queues and control-data queues in accordance with an embodiment of the present invention.

FIG. 16 illustrates multiple logical queues maintained by each input port of a stand-alone electronic switch plane 1570 of FIG. 15. The queues include 16 user-data (payload data) queues 1682-0 to 1682-15 and control-data queues 1684-0 and 1684-1. Each user-data queue 1682 corresponds to an output port of electronic switch unit 1570. The control-data queues 1684 may not be required, or may be very short queues each holding one control data unit. As described above, control data in control-data queues 1684-0, 1684-1 are sent to switch-plane controller 1595 through reserved time slots to be illustrated in FIG. 17 and, hence, there is no build-up of control data at any input port of electronic switch unit 1570.

Figure 17:
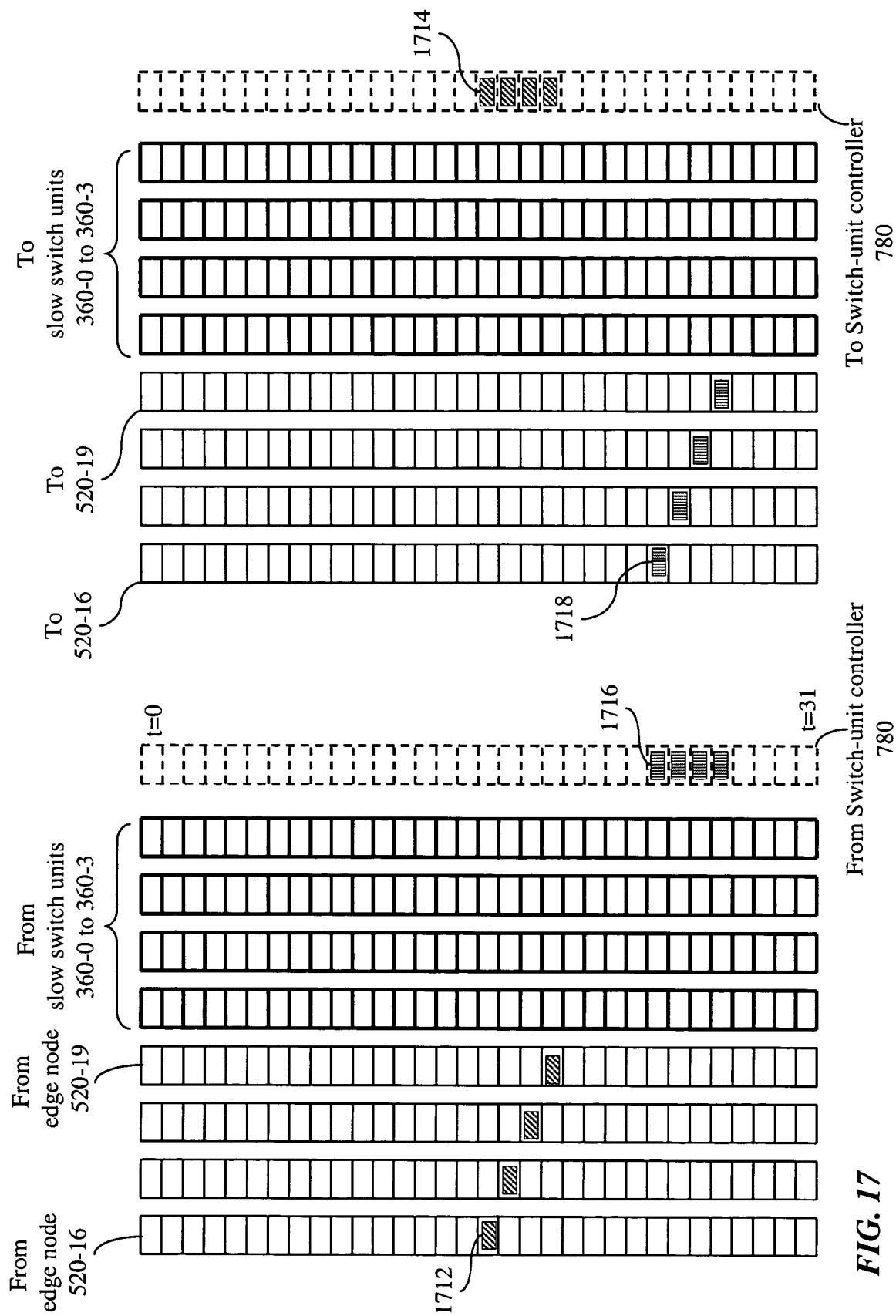
FIG. 17 illustrates reserved time-slots in a periodic slotted time frame, where the reserved time slots are used for exchanging control data between edge nodes and a switch-unit controller in the switch plane of FIG. 11 or FIG. 15.

In a fast switch unit 450 having its own switch-unit controller 780 (FIG. 7A), control signals from source edge nodes 520 are preferably communicated to the switch-unit controller 780 during dedicated consecutive time slots. Likewise, control signals from the switch-unit controller 780 to the edge nodes are sent over dedicated time slots. FIG. 17 illustrates an exemplary allocation of control time slots in a periodic time frame for edge nodes 520 connecting to a fast switch unit 450. In this example, the periodic time frame comprises 32 time slots and each fast switch unit 450 has 9 input ports and 9 output ports. The input ports include four inlet ports receiving signals from edge nodes 520, four inward ports receiving signals from inner switch units 360 or 1570, and one control input port for receiving control data from a switch-unit controller 780 associated with the fast switch unit 450. The output ports include four outlet ports transmitting signals to edge nodes 520, four outward ports transmitting signals to the inner switch units 360 or 1570, and one control output port for transmitting data to the switch-unit controller 780.

The switch-unit controller 780 of a fast switch unit 450 receives control data from all inlet ports through the control output port during different time slots. The control data may include time-locking data and connection-scheduling data. The time-locking data is used for ensuring continuous time-locking of each edge node to a master time counter associated with the fast switch unit 450 or with the entire switch plane to which the fast switch unit 450 belongs. The connection-scheduling data may be partially process by the switch-unit controller of fast switch unit 450 then further processed by a switch-plane controller 1390 (FIG. 13), or by a group controller 1486 then a switch-plane controller 1490 (FIG. 14). In the control arrangements of FIG. 13 or FIG. 14, the control time slots per fast switch unit 450 ought to be non-coincident because they are directed through a bufferless switch fabric to a single output control port. Control time slots in one fast switch unit 450 may coincide with control time slots of another fast switch unit 450 because the switch-unit controllers are electronic, hence data may be buffered and transmitted during arbitrary time slots. There may be advantages, however, in avoiding or minimizing control-time-slot overlap among different fast switch units 450. For example, it may be desirable to pass time-locking data received from edge nodes to a time-locking circuit associated with a switch-plane controller without buffering at a switch-unit controller 780. Assigning a single control time slot per inlet port of a fast switch unit 450, the 32 time slots of a time frame may be assigned to 32 edge nodes. The switch-plane 540 of FIG. 11 has 16 fast switch units 450 each supporting four edge nodes. Hence, a group controller connecting to the 16 switch-unit controllers 780 requires two dual ports for conflict-free exchange of control data with the 16 switch-unit controllers. In FIG. 17, the 32 time slots of the time frame are assumed to be allocated, for control purposes, to 32 edge nodes 520 from among 64 edge nodes 520 individually identified as 520-0, 520-1, ..., 520-63. As indicated, time slots 1712 are allocated to four edge nodes 520-16 to 520-19 to transmit control data to the control-output port of the fast switch unit 450 to which the four edge nodes connect. The time slots are indicated at the control output port as time slots 1714. In the reverse direction, Consecutive time slots 1716 at the control input port of the fast switch unit 450 are allocated for conflict-free transfer of control data to the four edge nodes, 520-16 to 520-19, through the outlet ports where they are indicated as time slots 1718.

Figure 18:
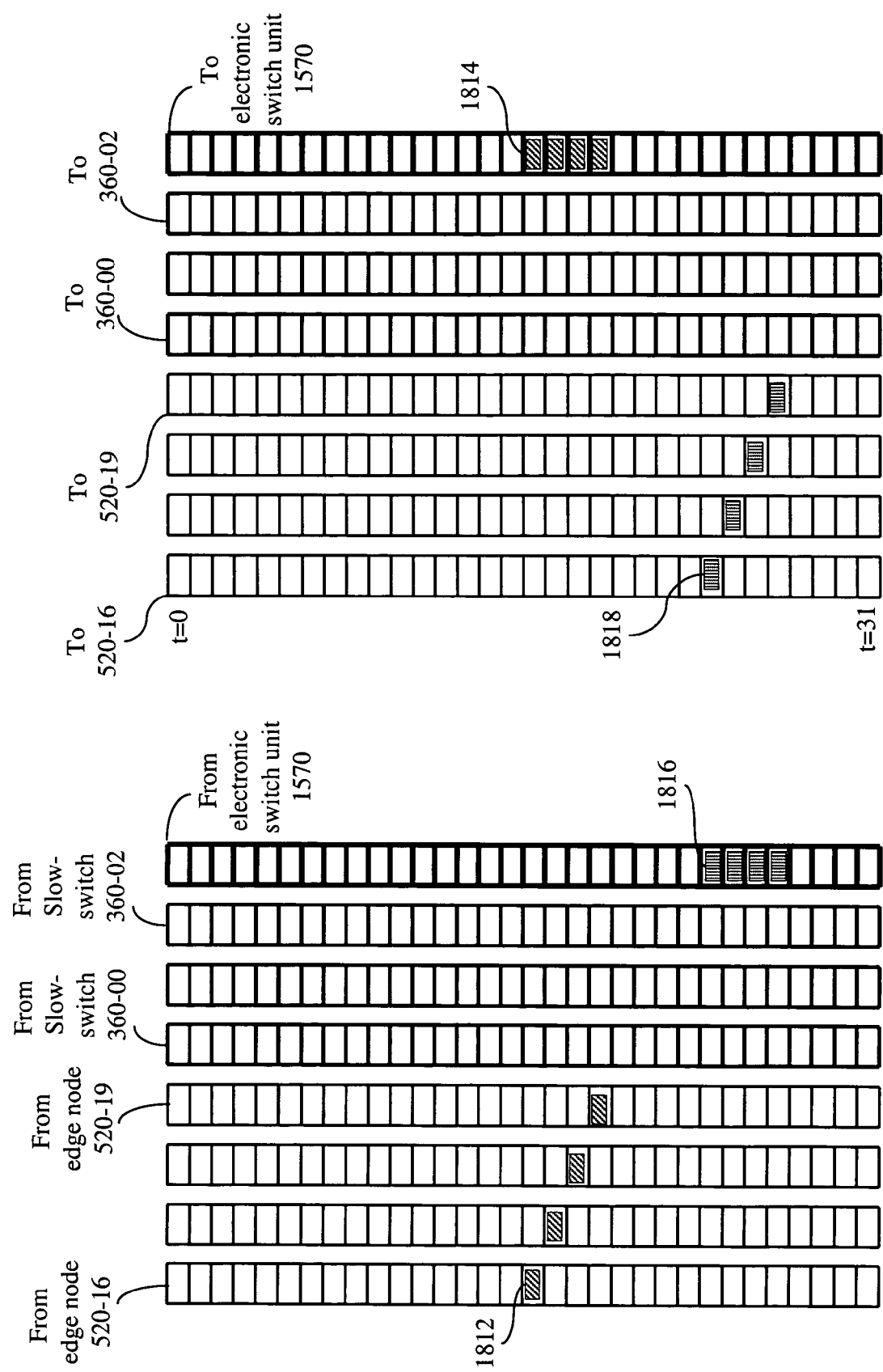
FIG. 18 illustrates reserved time-slots in a periodic slotted time frame where the reserved time slots are used for exchanging control data between edge nodes and a switch-plane controller through a fast switch unit and the electronic switch unit in the switch plane of FIG. 15.

In a fast switch-unit 450 connecting to an inner electronic switch unit 1570, which supports a switch-plane controller 1595, control signals are exchanged between edge nodes 520 and the switch-plane controller 1595 during reserved consecutive time slots. FIG. 18 illustrates an exemplary allocation of control time slots in a periodic time frame for edge nodes 520 connecting to a fast switch unit 450 for timely exchange of control data through the electronic switch unit of FIG. 15 which has three slow optical switch units 360 and one electronic switch unit 1570. In this example, the periodic time frame comprises 32 time slots and each fast switch unit 450 has 8 input ports and 8 output ports. The input ports include four inlet ports receiving signals from edge nodes, three inward ports receiving signals from inner slow optical switch units 360, and one inward port for receiving data from electronic switch unit 1570 which includes control data from switch-plane controller 1595. The output ports include four outlet ports transmitting signals to edge nodes, three outward ports transmitting signals to the inner slow switch units 360, and one outward output port for transmitting data to the inner electronic switch-unit 1570 which include control data directed to the switch-plane controller 1595.

The switch-plane of FIG. 15 has 16 fast switch units 450 each supporting four edge nodes to a total of 64 edge nodes 520. Control data, together with payload data, are transferred from an outward port of each of the 16 fast switch units 450B of switch plane 540 of FIG. 15 through an input port 1572 of electronic switch unit 1570 to switch-plane controller 1595. Although each input port 1572 of electronic switch unit 1570 may have buffers that may hold both payload data and control data as illustrated in FIG. 16, it is of paramount importance that the control data, especially time-locking data, be transferred without contention. Hence, 32 edge nodes may be assigned different control time slots per time frame and the switch-plane controller 1595 requires two dual ports 1574/1575 in electronic switch-unit 1570 for conflict-free exchange of control data. In FIG. 18, the 32 time slots of the time frame are assumed to be allocated, for control purposes, to 32 edge nodes 520 from among 64 edge nodes 520 individually identified as 520-0, 520-1, ..., 520-63. As indicated, time slots 1812 are allocated to edge nodes 520-16 to 520-19, connecting to one of the fast switch units 450, to transmit control data to switch-plane controller 1595 through the fast switch unit 450 to which the four edge nodes connect. The time slots are indicated at the outward port connecting to the electronic switch unit 1570 as time slots 1814. In the reverse direction, consecutive time slots 1816 at the inward port, of the fast switch unit 450, connecting to the electronic switch unit 1570 are allocated for conflict-free transfer of control data to the four edge nodes, 520-16 to 520-19, through the outlet ports of the fast switch unit 450 to which they belong, where they are indicated as time slots 1818.

Figure 19:
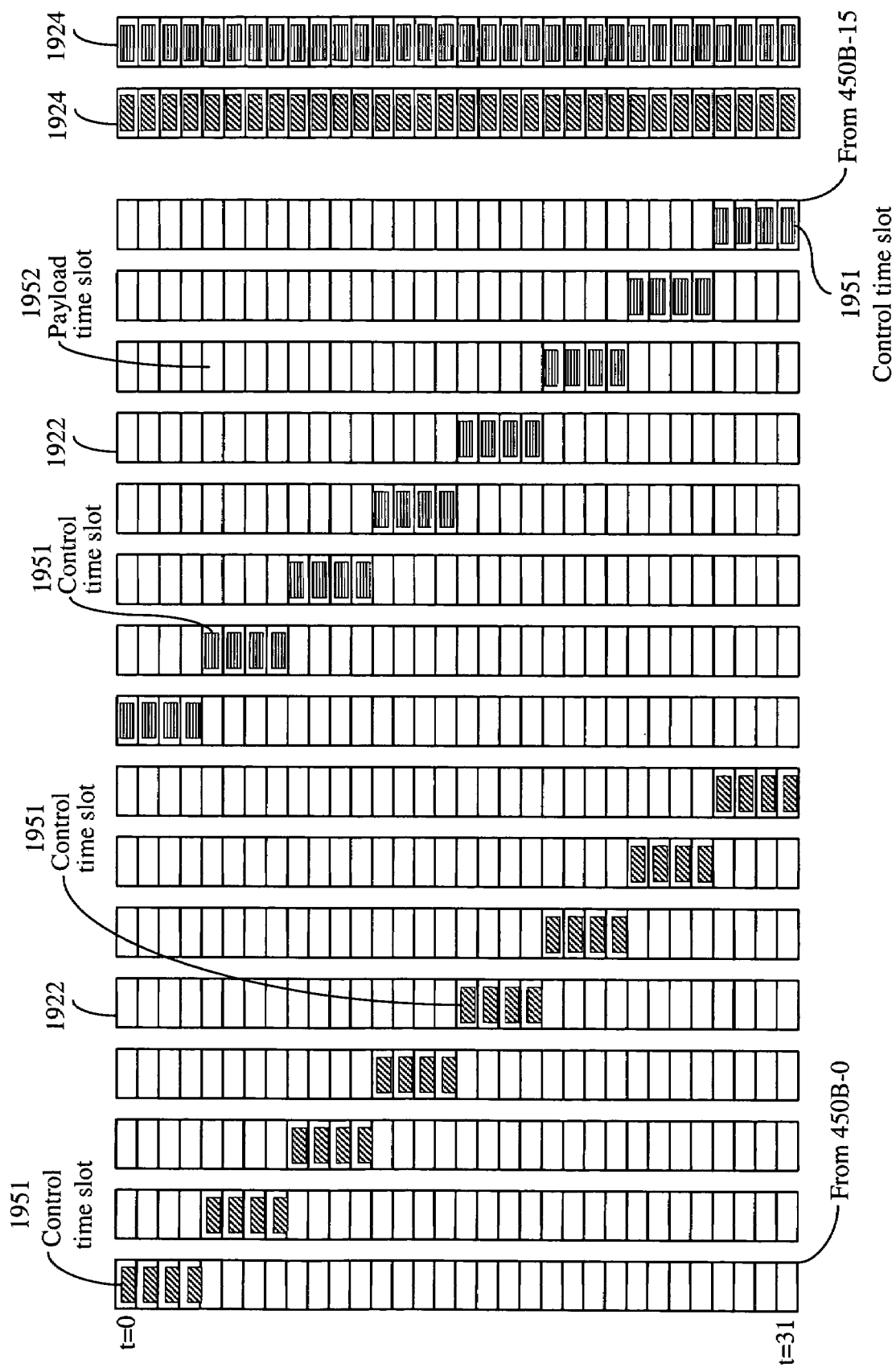
FIG. 19 illustrates an exemplary allocation of control time slots in a periodic slotted time frame for all edge nodes connecting to the inner electronic switch plane of FIG. 15 in accordance with an embodiment of the present invention.

FIG. 19 illustrates an exemplary control-time-slot reservation for the entire switch plane 540 of FIG. 15. The total number of edge nodes 520 in the switch plane of FIG. 15 is 64; hence 64 control time slots per frame are needed. With a time frame of 32 time slots each, two dual control ports 1574/1575 are used. Each of the illustrated 16 arrays 1922 corresponds to an outward port of a fast switch unit 450B connecting to an input port of inner electronic switch unit 1570. Each of the two arrays 1924 corresponds to a control port 1575 connecting to switch-plane controller 1595. An array 1922 represents a periodic time frame divided into 32 time slots which include four control time slots 1951 and 28 payload time slots 1952. Each of the four control time slots 1951 corresponds to an edge node 520. The control time slots 1951 allocated to 32 edge nodes 520 connecting to eight of the sixteen fast switch units 450B are spread as indicated so that control signals from the 32 edge nodes can be directed to the switch-plane controller 1595 through one control port 1575. Likewise, the other control port 1575 receives control signals from the remaining 32 edge nodes 520.

Figure 20:
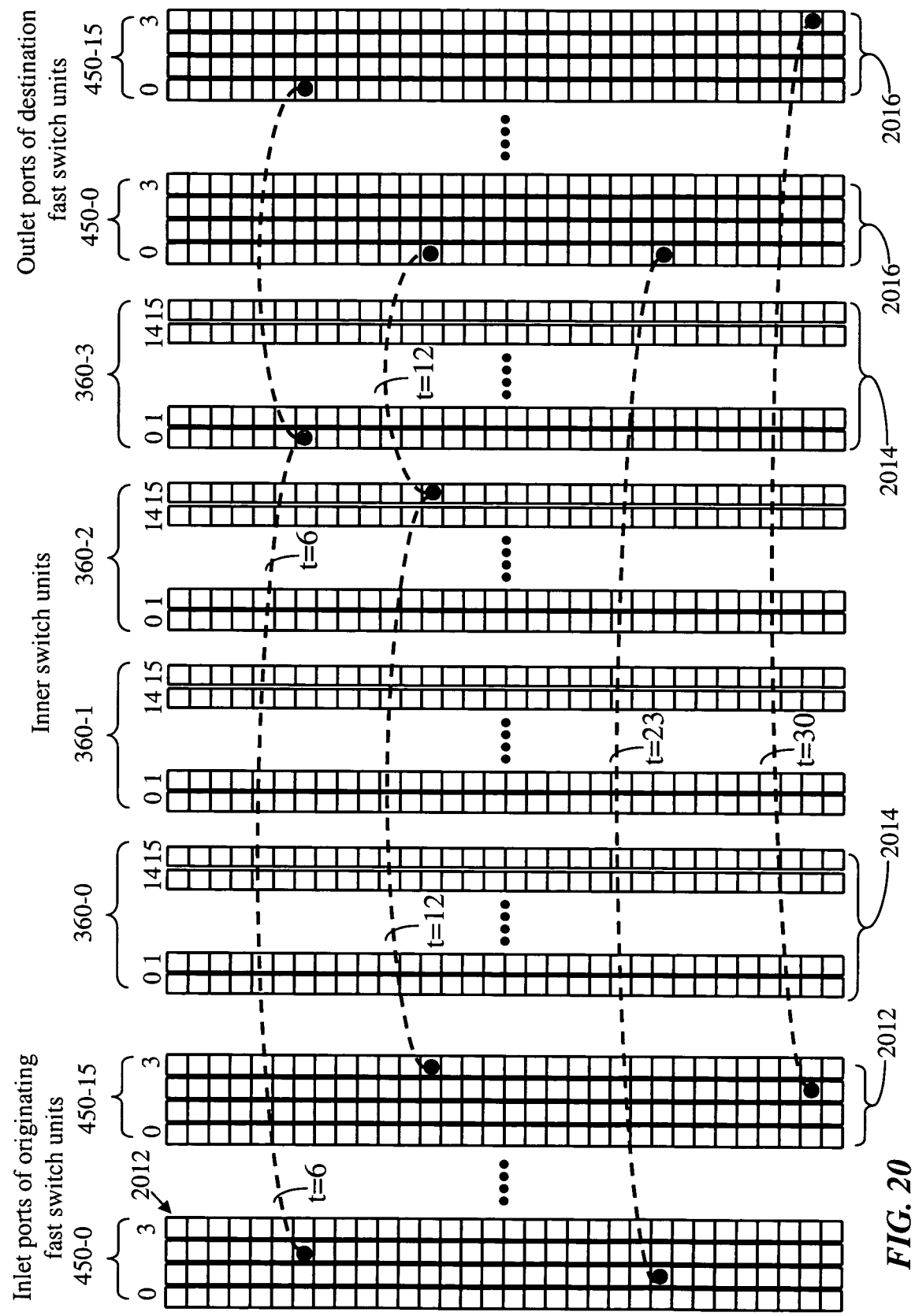
FIG. 20 illustrates data structures maintained by a switch-plane controller for scheduling connections across a switch plane in the network of FIG. 5 in accordance with an embodiment of the present invention.

FIG. 20 illustrates data structures maintained by a switch-plane controller for scheduling connections across the switch plane. A matrix 2012 associated with an originating fast switch unit 450 (to which originating edge nodes 520 are connected) of the switch plane has a number of columns equal to the number of inlet ports of the originating fast switch unit and a number of rows equal to the number of time slots per time frame. A matrix 2016 associated with a destination fast switch unit (connecting to destination edge nodes 520) of the switch plane has a number of columns equal to the number of outlet ports of the destination fast optical switch unit and a number of rows equal to the number of time slots per time frame. A matrix 2014 associated with each slow optical switch unit 360 has a number of columns equal to the number of input ports of the slow optical switch unit and a number of rows equal to the number of time slots per time frame. Each input port of switch unit 360 has a path 1142 to an output port of the same switch unit 360. The switch unit 360 may be reconfigured at a slow pace, every few seconds for example, according to variations of the aggregate spatial traffic offered to the switch unit 360. Thus, a path 1142 may connect an input port of a switch unit 360 to different output ports of the switch unit 360 during successive time instants separated by relatively long intervals. During redirection of a path 1142 from an input port to a new output port of a switch unit 360, the input port and the new output port are kept idle during a period exceeding the switching latency of switch unit 360, which may be of the order of several milliseconds. In the exemplary switch plane of FIG. 15, each fast switch unit 450 has four inlet ports, four outlet ports, four inward ports, and four outward ports. With a time frame of 32 time slots, each matrix 2012 has four columns (indexed as 0 to 3), each matrix 2014 has sixteen columns (indexed as 0 to 15), and each matrix 2016 has four columns (indexed as 0 to 3). Each of matrices 2012, 2014, and 2016 has 32 rows indexed as 0 to 31.

Referring to FIG. 6, the exemplary integrated fast switch unit 450 has input ports including four inlet ports connecting to source edge nodes 520 and four inward ports connecting to four inner switch units 360, and output ports including four outward ports connecting to the four inner switch units, and four outlet ports connecting to destination edge nodes 520. Matrices 2012, 2014, and 2016 are used for occupancy tracking of respective inlet ports of the originating fast switch units 450, input ports of slow switch units 360, and outlet ports of destination fast switch units 450. A connection request received by a switch-plane controller 1390 or 1490 specifies an originating edge node 520 and a destination edge node 520. The originating edge node has a channel to an inlet port of a fast switch unit 450, which is referenced herein as an originating fast switch unit 450. The destination edge node has a channel from an outlet port of a fast switch unit 450, which is referenced herein as a destination fast switch unit 450. A connection from the inlet port of the originating fast switch unit 450 to the outlet port of the destination fast switch unit 450 occupies at least one time slot indicated in: (1) a column corresponding to the originating edge node 520 in a matrix 2012 corresponding to the originating fast switch unit 450; (2) a column corresponding to the destination edge node in a matrix 2016 corresponding to the destination fast switch unit 450; and (3) a column in a matrix 2014 corresponding to an input port of an inner switch unit 360 that has a path 1142 to the outlet port of the destination fast optical switch unit 450. A path from an inlet port of a fast optical switch unit 450 to an outlet port of the same switch unit 450, i.e., a path between any two edge nodes connecting to the same fast optical switch unit 450, need not traverse an inner switch unit 360 (or 1570) and requires only a first-order time-slot matching process to determine matching time slots for a connection. Examples of such first-order paths are illustrated in FIG. 20 where a path is established between inlet-port 1 and outlet port 0 of a fast switch unit 450-0 during time slot t=23 and another path is established between inlet-port 2 to outlet-port 3 of fast switch unit 450-15 during time slot t=30 where the time slots of a time frame are referenced as t=0 to t=31. A path from inlet-port 2 of fast switch unit 450-0 to outlet-port 0 of fast switch unit 450-15 traverses inner slow optical switch unit 360-3 which has an internal path 1142 connecting fast switch unit 450-0 to fast switch unit 450-15. Establishing the entire path requires a second-order time-slot matching process which requires examining the occupancy state of inlet-port 2 of fast switch unit 450-0, outlet-port 0 of fast switch unit 450-15, and input-port 0 of inner slow optical switch unit 360-3. During matching time slot t=6, the three ports are determined to be vacant as illustrated in FIG. 20. For clarity, FIG. 11 indicates only connections 1142 from each input port 0 of slow switch units 360-0, 360-1, 360-2, and 360-3. With an internal path 1142 from input port 15 to output port 0 of slow switch unit 360-2 established (not shown), a path traversing inlet-port 3 of fast switch unit 450-15, outlet-port 0 of fast switch-unit 450-0, and input port 15 of inner slow optical switch unit 360-2 may be set; during a matching time slot—illustrated as t=12 in FIG. 20.

Figure 21:
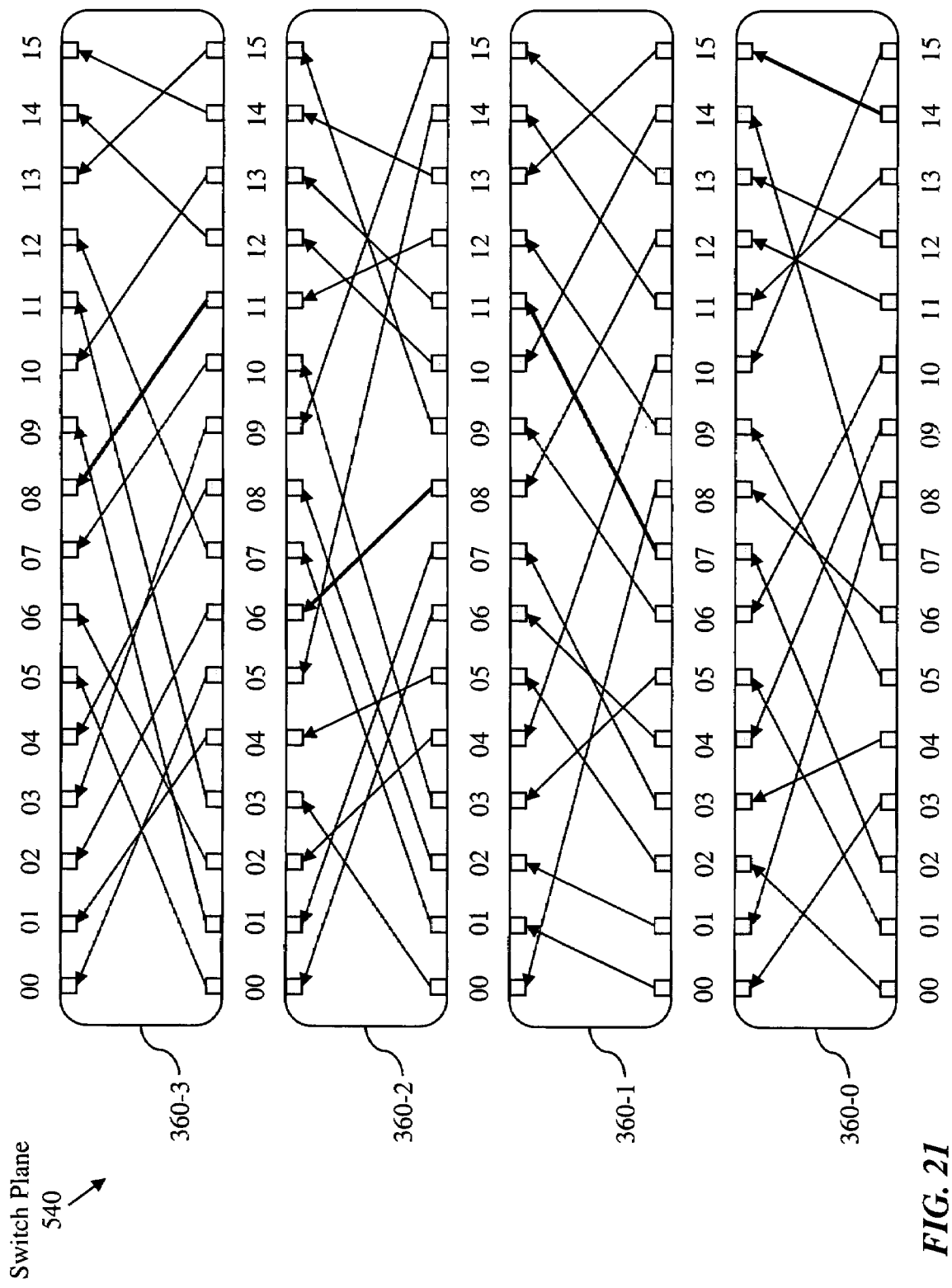
FIG. 21 illustrates connectivity of inner slow switch units of a switch plane in the network of FIG. 5.

FIG. 21 illustrates connectivity of inner slow optical switch units 360 of a switch plane 540 in network 500. The switch plane 540 has four inner slow optical switch units 360 each having 16 input ports and 16 output ports. The inner slow optical switch units 360 may be reconfigured to alter connectivity as the spatial distribution of traffic changes.

Figure 22:
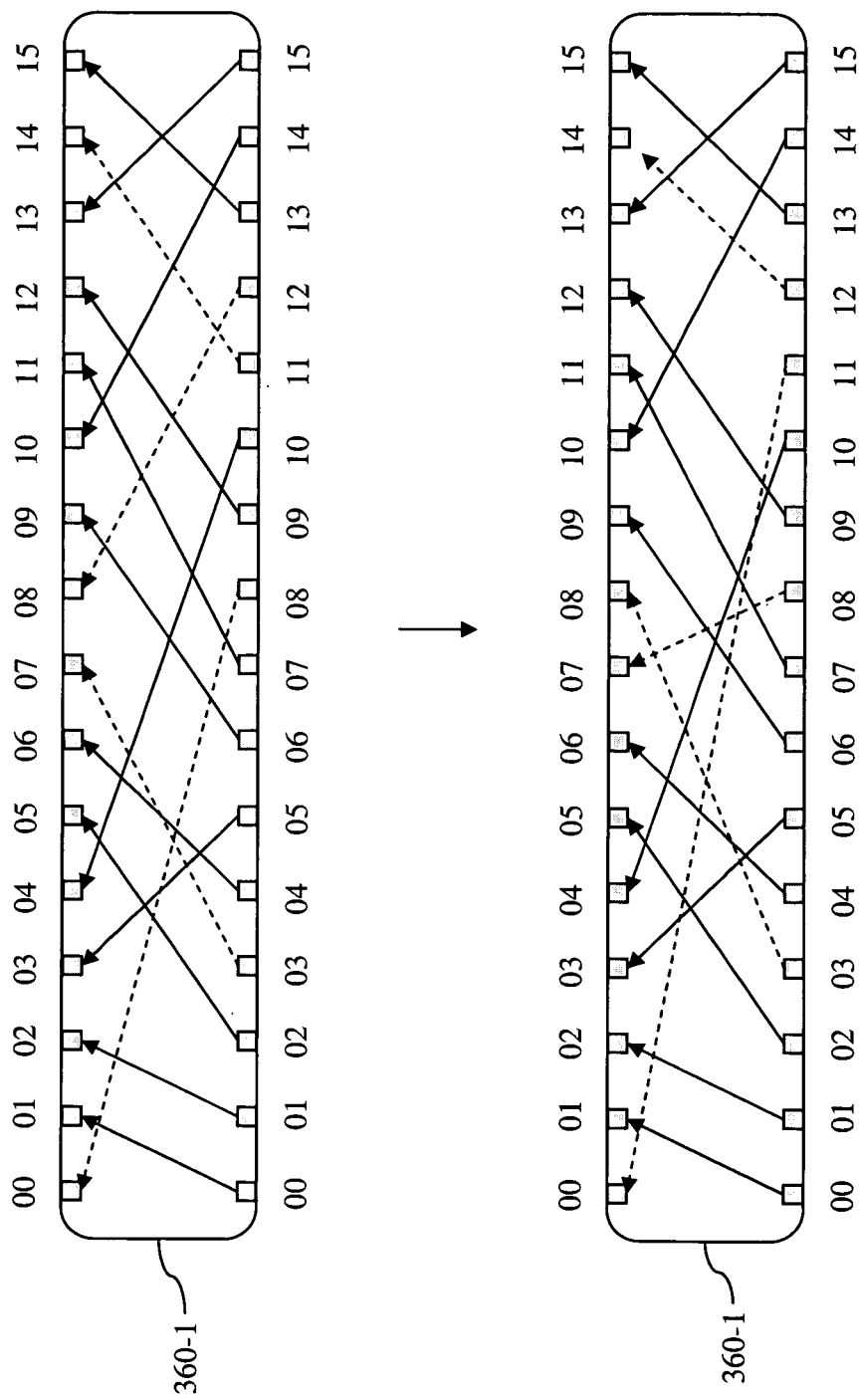
FIG. 22 illustrates connectivity rearrangement within an inner slow switch unit of a switch plane in the network of FIG. 5.

FIG. 22 illustrates connectivity change (reconfiguration) in a slow switch unit 360 where four of sixteen internal connections are modified in response to spatial traffic variation. In the top configuration, input ports labeled 03, 08, 11, and 12 connect to output ports labeled 07, 00, 14, and 08 respectively. After reconfiguration, input ports 03, 08, 11, and 12 are connected to output ports 08, 07, 00, and 14, respectively. To reduce the processing effort, reconfiguration of the slow switch units 360, or subsets of the slow switch units 360, of a switch plane 540 may be considered at predefined periodic instants of time; every one second for example. Of course, reconfiguration would take place only if warranted due to changing traffic conditions.

Network Coverage

An edge node 520 may have a capacity that varies from a moderate value of 160 Gb/s or so to several hundred terabits per second. Using edge nodes 520 each having 1024 input ports and 1024 output ports for example, the input ports may be divided into 512 ingress ports receiving data from data sources (terminals) and 512 inbound ports connecting to switch planes 540, and the output ports may be divided into 512 egress ports transmitting data to traffic sinks (terminals) and 512 outbound ports connected to switch planes 540. With each input port or output port having a capacity of 10 Gb/s, the access capacity of the edge node would be 5.12 Terabits/second. Considering terminals with a mean flow rate of 10 Megabits/second in each of the upstream and downstream directions, more than 400,000 simultaneously active terminals may be served by an edge node, even with violent temporal variations of the individual flow rates. Considering a typical proportion of 0.1 of the terminals being simultaneously active, the total number of terminals supported per edge node would substantially exceed one million. With a network 500 comprising 32,000 edge nodes, the total number of terminals that can be supported by the network 500 would exceed 32 billion. It is noted that a mean flow rate of an active terminal of 10 Mb/s is substantially higher than the mean terminal flow rate in current networks. It may also be noted that a terminal, which includes a data source and a data sink, may have a significant difference in traffic flow rate in the upstream direction (towards the network) and downstream direction (from the network). Such asymmetry may be taken into account in the configuration of edge nodes 520.

In a large-scale switch plane 540 supporting, for example, more than 10,000 edge nodes, the switch-plane controller 1490 (FIG. 14) or switch-plane controller 1595 (FIG. 15) may need to schedule connections at a very high rate. Several implementations of high-throughput schedulers are known in the art and may be used in switch-plane controllers 1490 or 1595. For example, U.S. patent application Ser. No. 11/002, 580, Publication No. 2006-0120379, titled "High-speed scheduling apparatus for a switching node", discloses a scheduling apparatus which comprises multiple scheduler units assigned in a variety of ways to non-intersecting control domains for establishing connections through a switching node. The control domains are defined by spatial and temporal aspects and may be dynamically selected and assigned to scheduler units in a manner that achieves a high throughput gain. Control domains may be considered in a cyclic discipline or a pipeline discipline for handling connection requests.

Network 500 is predominantly edge controlled and a controller of each edge node 520 may condense traffic data for use in determining the connectivity of slow optical switch units in switch planes 540. In order to adapt the connectivity of slow switch units 360 in each switch plane 540 to traffic variation, a global reconfiguration server may be connected to one of the edge nodes to be accessed periodically by each other edge node. The global reconfiguration server may receive condensed traffic data from edge-node controllers and determine if reconfiguration of any slow optical switch unit in the network is warranted. Reconfiguration requests, if any, are then communicated to individual switch-plane controllers through the network 500.

Network 500 has been described with each switch plane 540 having the form of switch plane 440 which comprises integrated optical fast switch units 450 interconnected by a switch-plane core. The switch plane core may comprise slow optical switch units 360 of large dimension or slow optical switch units 360 of large dimension and at least one electronic switch unit 1570 of large dimension. In an alternative embodiment, switch plane 540 may have the form of switch plane 340 which comprises a switch-plane core connecting a first plurality of optical fast switch units 350 to a third plurality of optical fast switch units 370. In a network based on switch plane 340, each connection traverses a fast switch unit 350 and a fast switch unit 370, thus requiring a second-order time-slot matching process. In a network based on switch plane 440, some connections require a simple first-order time-slot matching process.

In accordance with the present invention, novel switch planes and networks incorporating such switch planes have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A network comprising:
    a plurality of switch planes each comprising a plurality of first switch units, each of the first switch units being interconnected to at least two of the other first switch units through a plurality of second switch units to thereby conduct bidirectional network traffic between each of the first switch units and the at least two other first switch units, each of the first switch units having a switching latency less than a switching latency of each of the second switch units and a dimension less than a dimension of each of the second switch units; and
    a plurality of edge nodes each having at least one upstream channel to at least one of the first switch units and at least one downstream channel from at least one of the first switch units.

2. The network of claim 1 wherein each switch plane further comprises:
    a switch-plane controller; and
    a plurality of switch-unit controllers each in communication with the switch plane controller and a respective one of the first switch units.

3. The network of claim 2 further comprising:
    a plurality of master time counters each in communication with a respective one of the switch planes;
    for each switch plane, a plurality of master time-locking circuits each in communication with a respective one of the first switch units and in communication with the master time counter of the switch plane, and
    for each edge node, a plurality of slave time-locking circuits each in communication with a master time-locking circuit of one of the switch planes.

4. The network of claim 2 wherein each of the first switch units provides a reserved control path from at least one inlet port of the each of the first switch units to a respective switch-unit controller from among the plurality of switch-unit controllers for a duration of at least one time slot in a predefined time frame.

5. The network of claim 2 further comprising a global reconfiguration server in communication with one of the edge nodes for receiving condensed traffic data from the plurality of edge nodes.

6. The network of claim 2 further comprising:
    an upstream wavelength router for distributing wavelength channels of multiple wavelength-division-multiplexed (WDM) upstream links, from a subset of the edge nodes, among a plurality of WDM links each directed to one of the switch planes; and
    a downstream wavelength router for distributing wavelength channels of a plurality of WDM links each originating from one of the switch planes among a plurality of downstream WDM links each directed to one of the edge nodes.

7. The network of claim 1 wherein at least one of the first switch units is an optical switch unit.

8. The network of claim 2 further comprising a scheduler in communication with the switch-plane controller, wherein the scheduler performs first-order time-slot-matching processes to allocate time slots in a predefined time frame for connections completed within the first switch units and the scheduler performs second-order time-slot-matching processes to allocate time slots in the predefined time frame for connections traversing any pair of the first switch units.

9. A network comprising:
    a plurality of switch planes, each switch plane comprising a plurality of first switch units, each of the first switch units being interconnected to at least two of the other first switch units through a switch-plane core, the switch-plane core comprising:
        a plurality of second switch units wherein each of the first switch units has a switching latency less than a switching latency of each of the second switch units and a dimension less than a dimension of each of the second switch units and wherein each of the second switch units is configured to conduct bidirectional network traffic between each of the first switch units and the at least two other first switch units;
        at least one electronic switch unit having a dimension exceeding the dimension of each of the second switch units; and
        a switch-plane controller in communication with a selected one of the at least one electronic switch units; and a plurality of edge nodes each having at least one upstream channel to at least one of the first switch units and at least one downstream channel from at least one of the first switch units.

10. The network of claim 9 further comprising:
a master time counter in communication with the switch-plane controller;
at least one master time-locking circuit in communication with the master time counter; and
for each of the edge nodes, a plurality of slave time-locking circuits, each slave time-locking circuit in communication with one of the at least one master time-locking circuit.

11. The network of claim 9 further comprising, for each switch plane, a scheduler in communication with the switch-plane controller, wherein the scheduler performs a first-order time-slot-matching process to allocate at least one time slot in a predefined time frame for a connection completed within one of the first switch units, performs a second-order time-slot-matching process to allocate at least one time slot in the predefined time frame for a connection traversing any pair of the first switch units and one of the second switch units, and performs three first-order time-slot-matching processes to allocate at least one time slot in the predefined time frame for a connection traversing any pair of the first switch units and an electronic switch unit from among the at least one electronic switch unit.

12. The network of claim 9 wherein each of the switch planes provides a reserved control path for a duration of a time slot in a predefined time frame from each edge node to the switch-plane controller, the control path traversing a first switch unit and the electronic switch unit.

13. The network of claim 9 further comprising, for each switch plane, a slave controller in communication with each of the second switch units, the slave controller in communication with a global reconfiguration server for receiving configuration-change instructions for at least one of the second switch units.

14. The network of claim 11 wherein the scheduler comprises a plurality of pipelined processing units.

* * * * *